United States Patent
Mutagi et al.

(10) Patent No.: US 10,027,662 B1
(45) Date of Patent: Jul. 17, 2018

(54) DYNAMIC USER AUTHENTICATION

(71) Applicant: Amazon Technologies, Inc., Seattle, WA (US)

(72) Inventors: Rohan Mutagi, Redmond, WA (US); Chintan Gohil, Seattle, WA (US); Sai Sailesh Kopuri, Seattle, WA (US); Philip Alexander Lee, Seattle, WA (US); Felix Wu, Seattle, WA (US); Nancy Yi Liang, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/370,103

(22) Filed: Dec. 6, 2016

(51) Int. Cl.
| H04L 29/06 | (2006.01) |
| G10L 15/30 | (2013.01) |
| G10L 17/06 | (2013.01) |
| G10L 15/18 | (2013.01) |
| G10L 17/22 | (2013.01) |
| G06F 21/32 | (2013.01) |

(52) U.S. Cl.
CPC .......... *H04L 63/0861* (2013.01); *G06F 21/32* (2013.01); *G10L 15/18* (2013.01); *G10L 15/30* (2013.01); *G10L 17/06* (2013.01); *G10L 17/22* (2013.01)

(58) Field of Classification Search
CPC ..... H04L 63/0861; G06F 21/32; G10L 15/30; G10L 17/22; G10L 17/06; G10L 15/18
See application file for complete search history.

(56) References Cited

U.S. PATENT DOCUMENTS

| 8,902,045 | B1* | 12/2014 | Linn | G06F 21/32 |
| | | | | 340/5.53 |
| 9,426,139 | B1* | 8/2016 | McClintock | H04L 63/08 |
| 2003/0097593 | A1* | 5/2003 | Sawa | G06F 21/31 |
| | | | | 726/4 |
| 2008/0101658 | A1* | 5/2008 | Ahern | G06F 21/32 |
| | | | | 382/115 |
| 2010/0115592 | A1* | 5/2010 | Belz | G06F 21/10 |
| | | | | 726/5 |
| 2012/0245941 | A1* | 9/2012 | Cheyer | G06F 21/32 |
| | | | | 704/246 |

(Continued)

*Primary Examiner* — Michael Pyzocha
(74) *Attorney, Agent, or Firm* — Pierce Atwood LLP

(57) ABSTRACT

Systems, methods, and devices for dynamically authenticating a user are disclosed. A speech-controlled device captures a spoken command, and sends audio data corresponding thereto to a server. The server determines the audio data includes a spoken command to receive content, and therefrom determines a source storing the content. The server also determines threshold user authentication confidence score data associated with the content source. Based at least in part on the threshold user authentication confidence score data, the server determines a user authentication technique, and a device configured to capture user authentication data. The server determines user authentication confidence score data using user authentication data received from the device, and determines weighted user authentication confidence score data therefrom. If the weighted user authentication confidence score data satisfies the threshold user authentication confidence score data, the server receives the requested content from the content source.

20 Claims, 27 Drawing Sheets

(56) References Cited

U.S. PATENT DOCUMENTS

| | | | |
|---|---|---|---|
| 2013/0198081 A1* | 8/2013 | Royyuru | G06Q 20/322 705/44 |
| 2013/0232542 A1* | 9/2013 | Cheng | G06F 21/6218 726/1 |
| 2013/0263224 A1* | 10/2013 | Peters | G06F 21/31 726/4 |
| 2014/0189779 A1* | 7/2014 | Baghdasaryan | H04L 63/08 726/1 |
| 2015/0035643 A1* | 2/2015 | Kursun | G07C 9/00158 340/5.52 |
| 2015/0089668 A1* | 3/2015 | Baldwin | G06F 21/10 726/28 |
| 2015/0242601 A1* | 8/2015 | Griffiths | G06F 21/305 726/5 |
| 2015/0242605 A1* | 8/2015 | Du | G06F 21/32 726/7 |
| 2016/0087952 A1* | 3/2016 | Tartz | H04W 12/06 455/411 |
| 2016/0087957 A1* | 3/2016 | Shah | H04L 63/205 726/1 |
| 2016/0196556 A1* | 7/2016 | Tamboly | G06Q 20/40 705/71 |
| 2016/0359827 A1* | 12/2016 | Krishnaiah | H04L 63/08 |

* cited by examiner

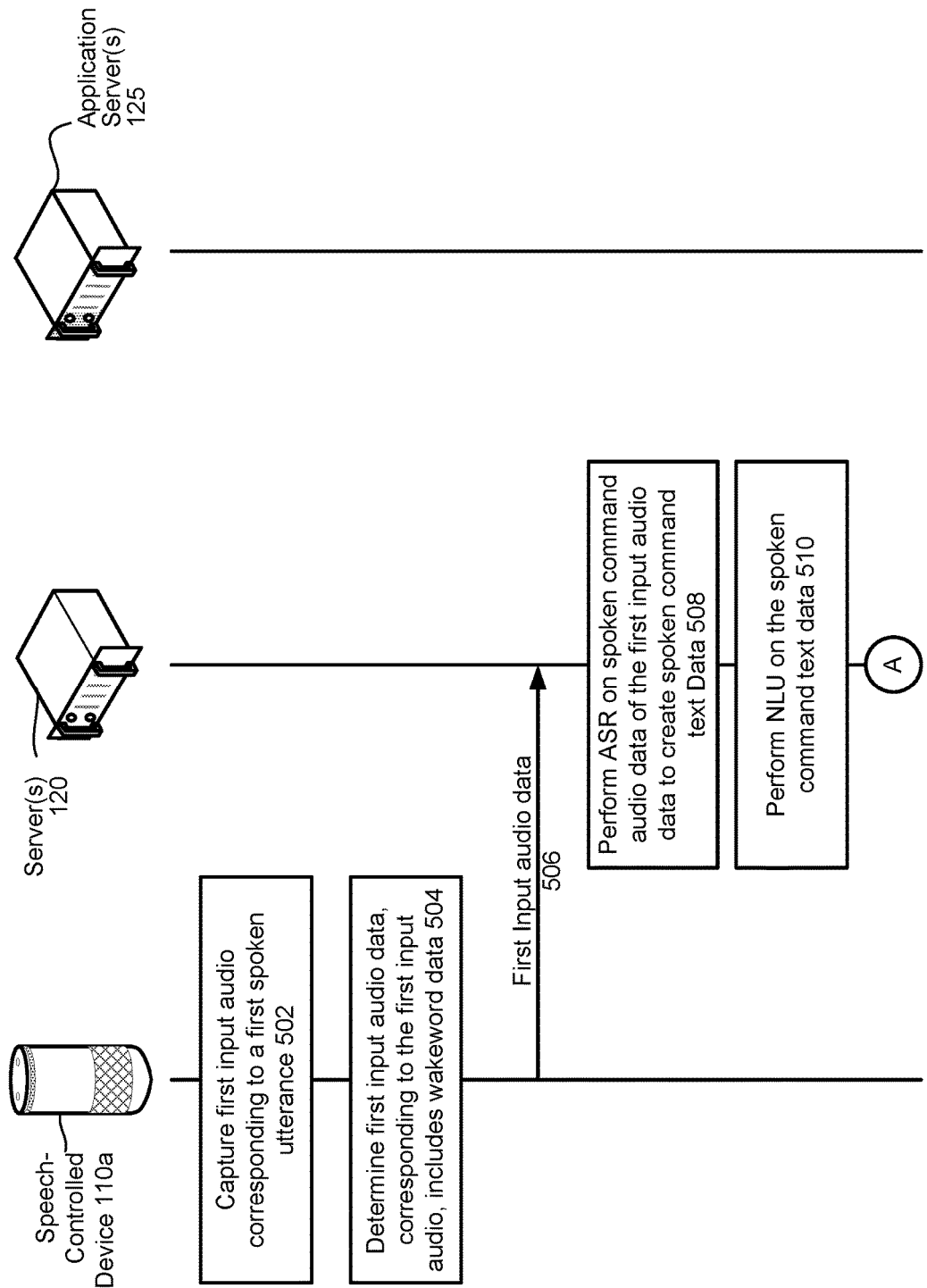

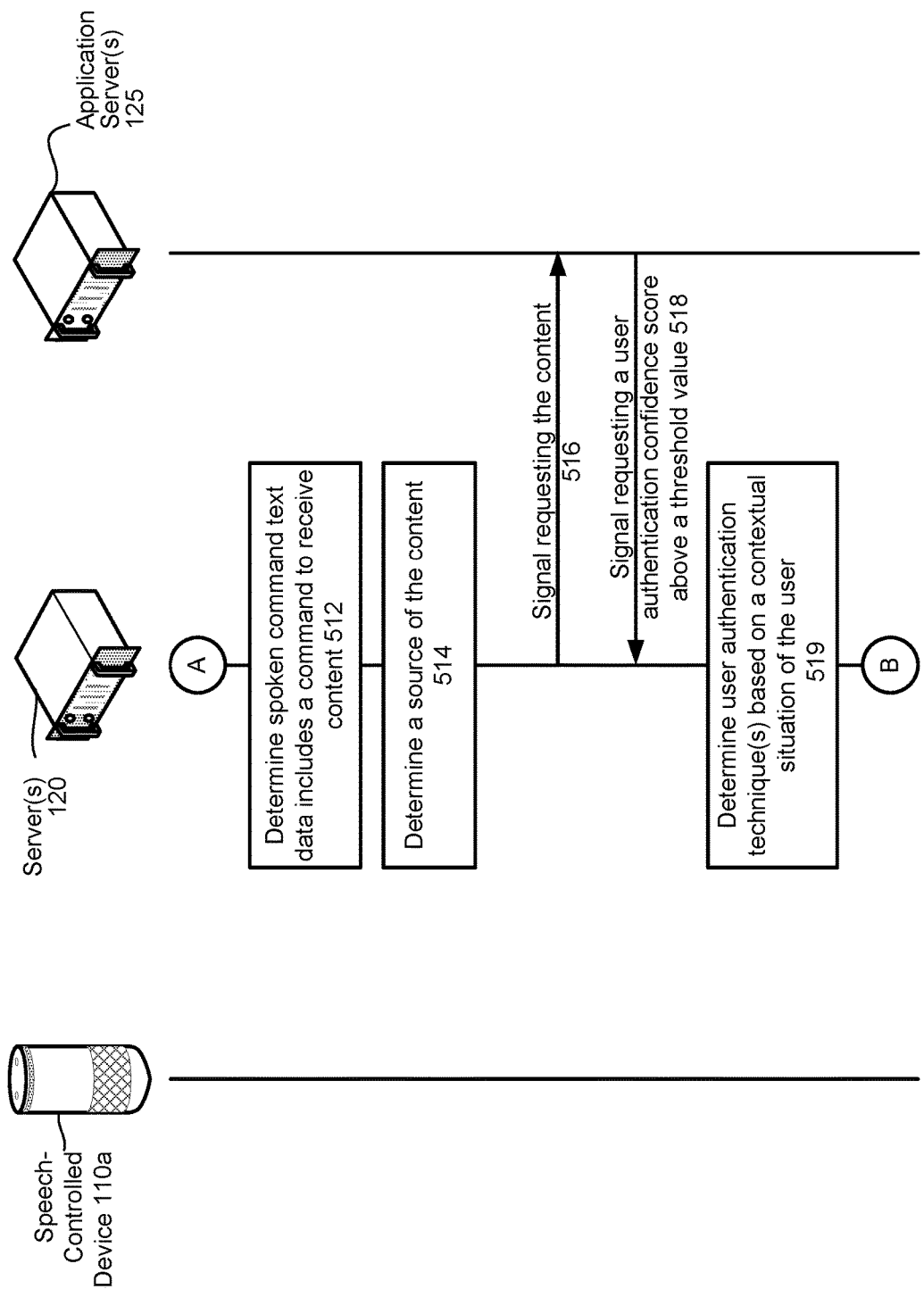

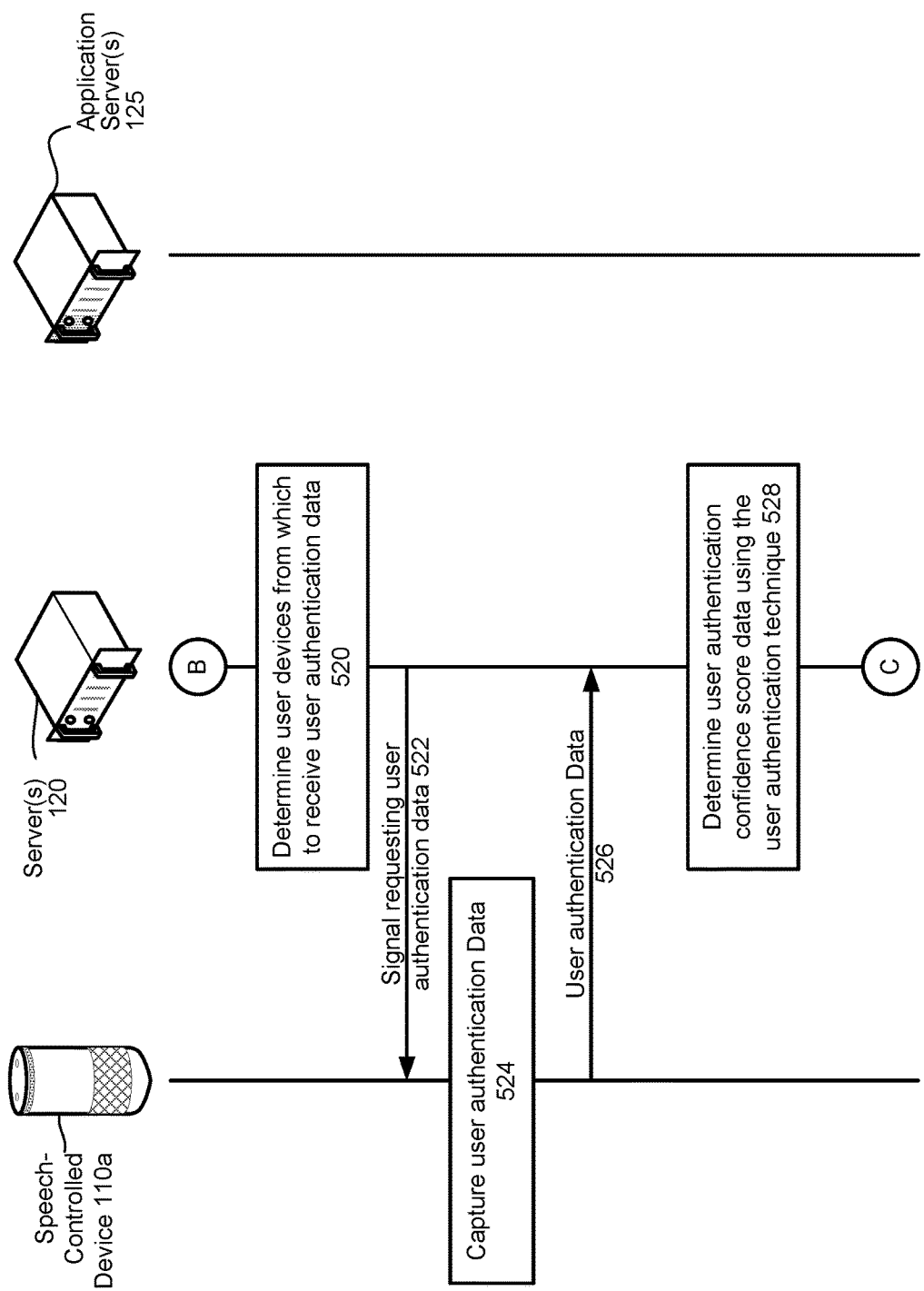

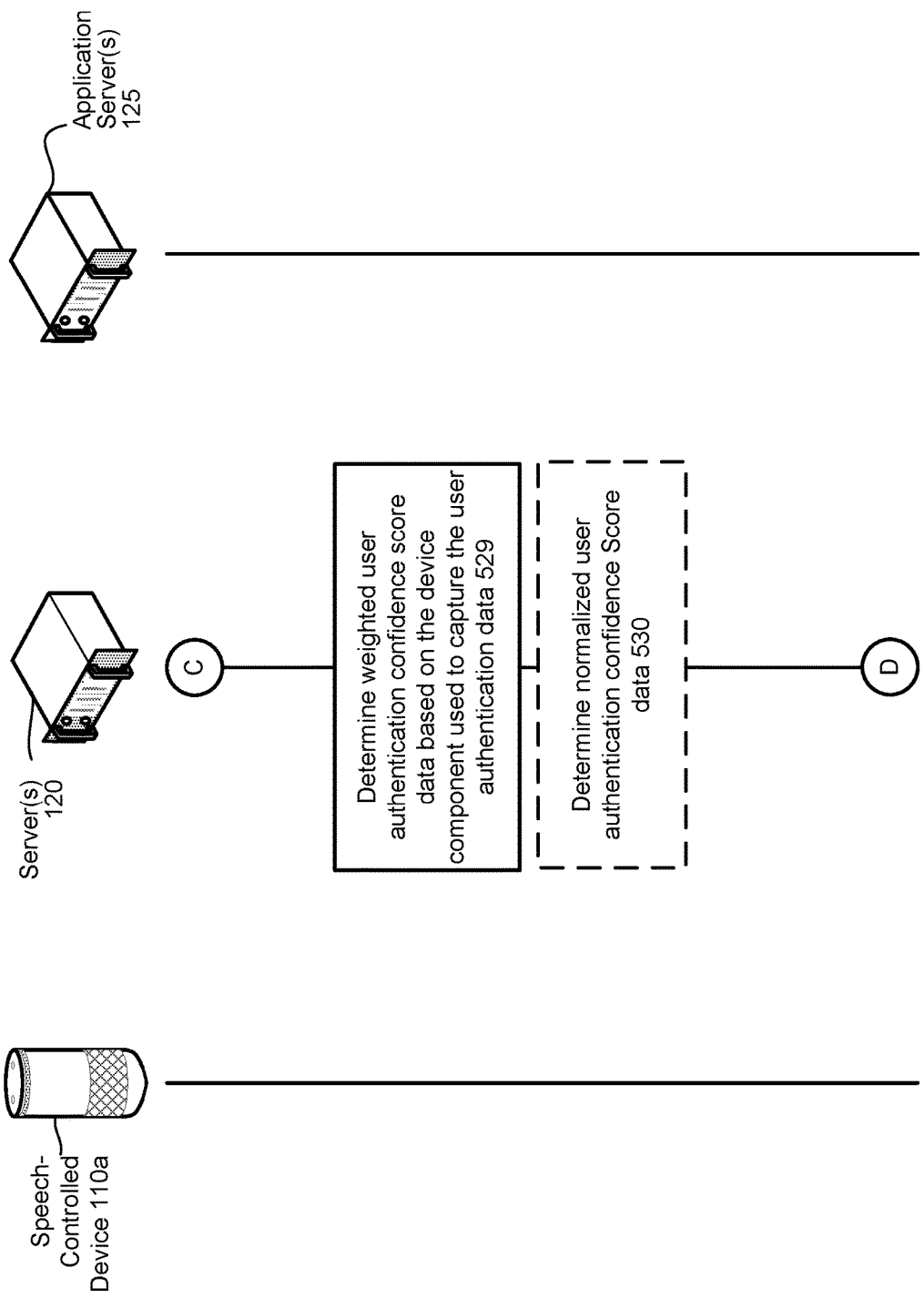

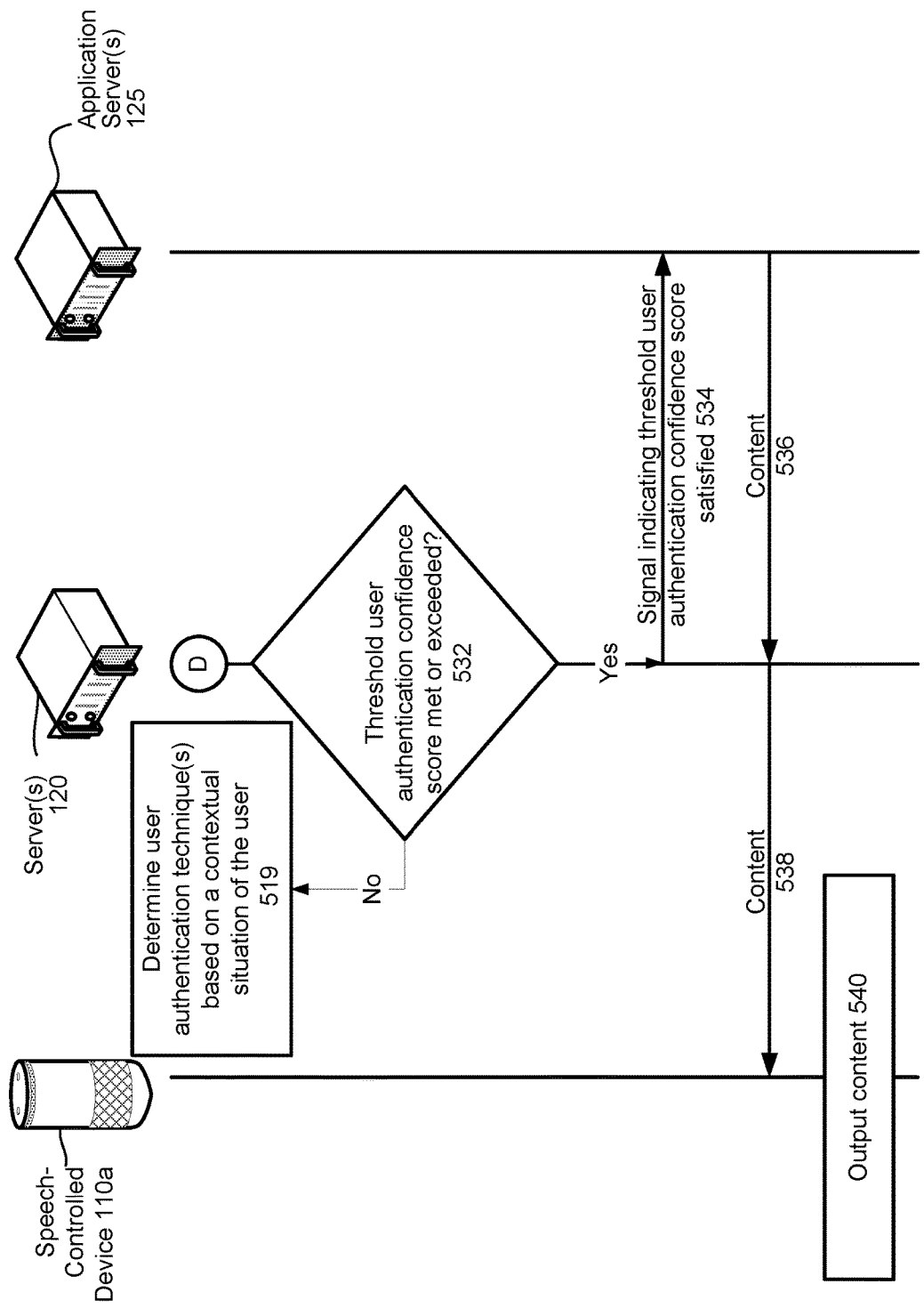

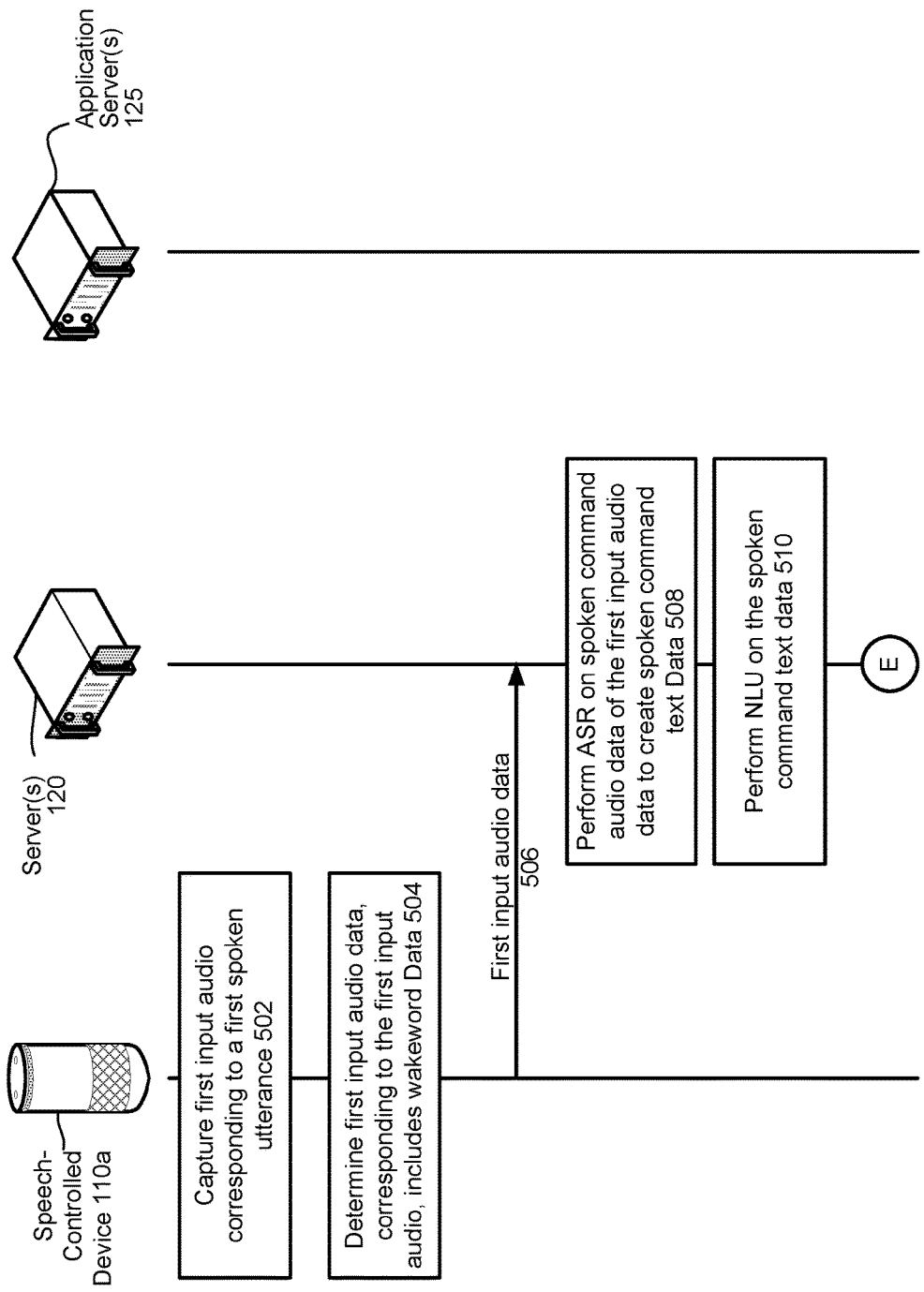

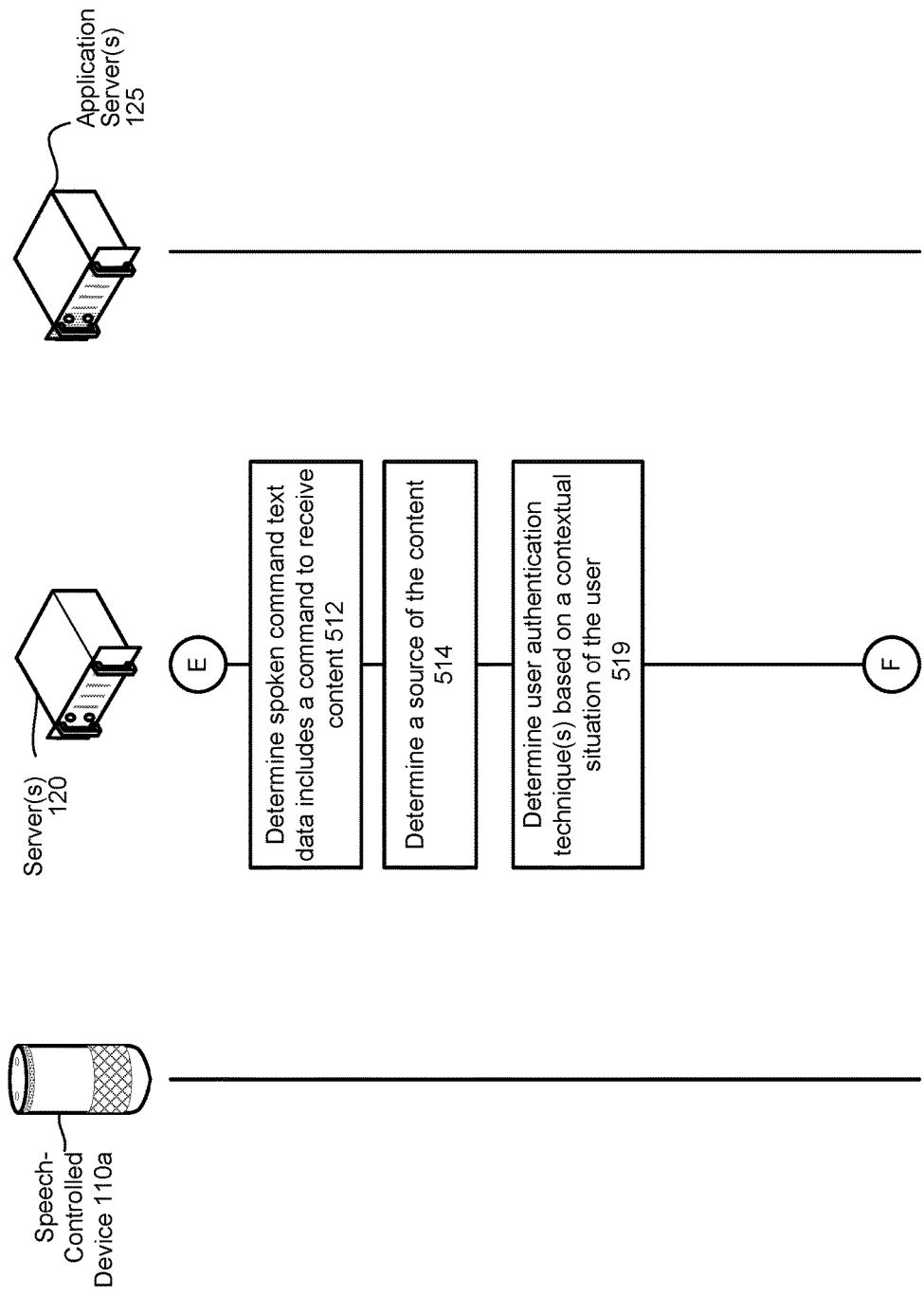

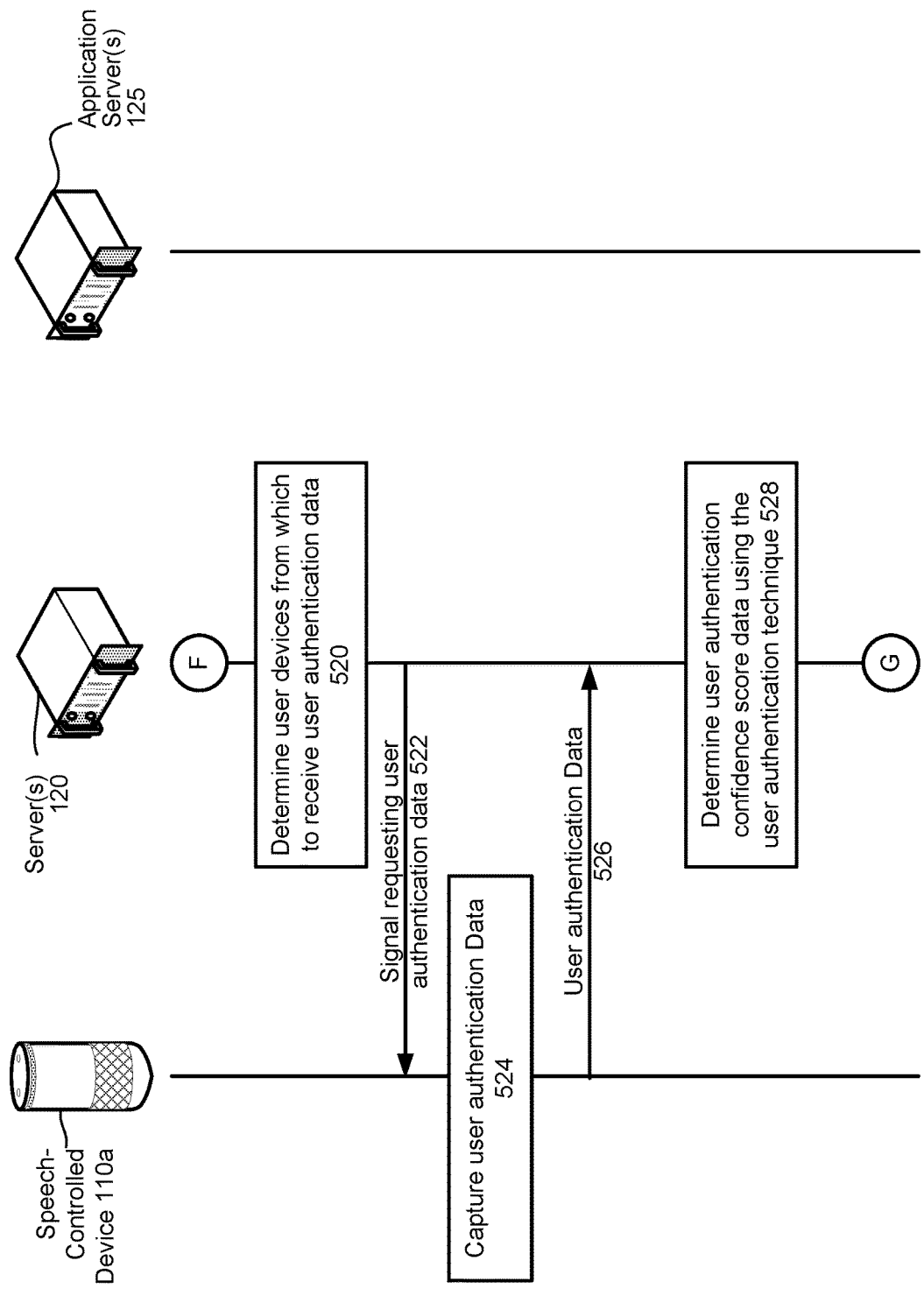

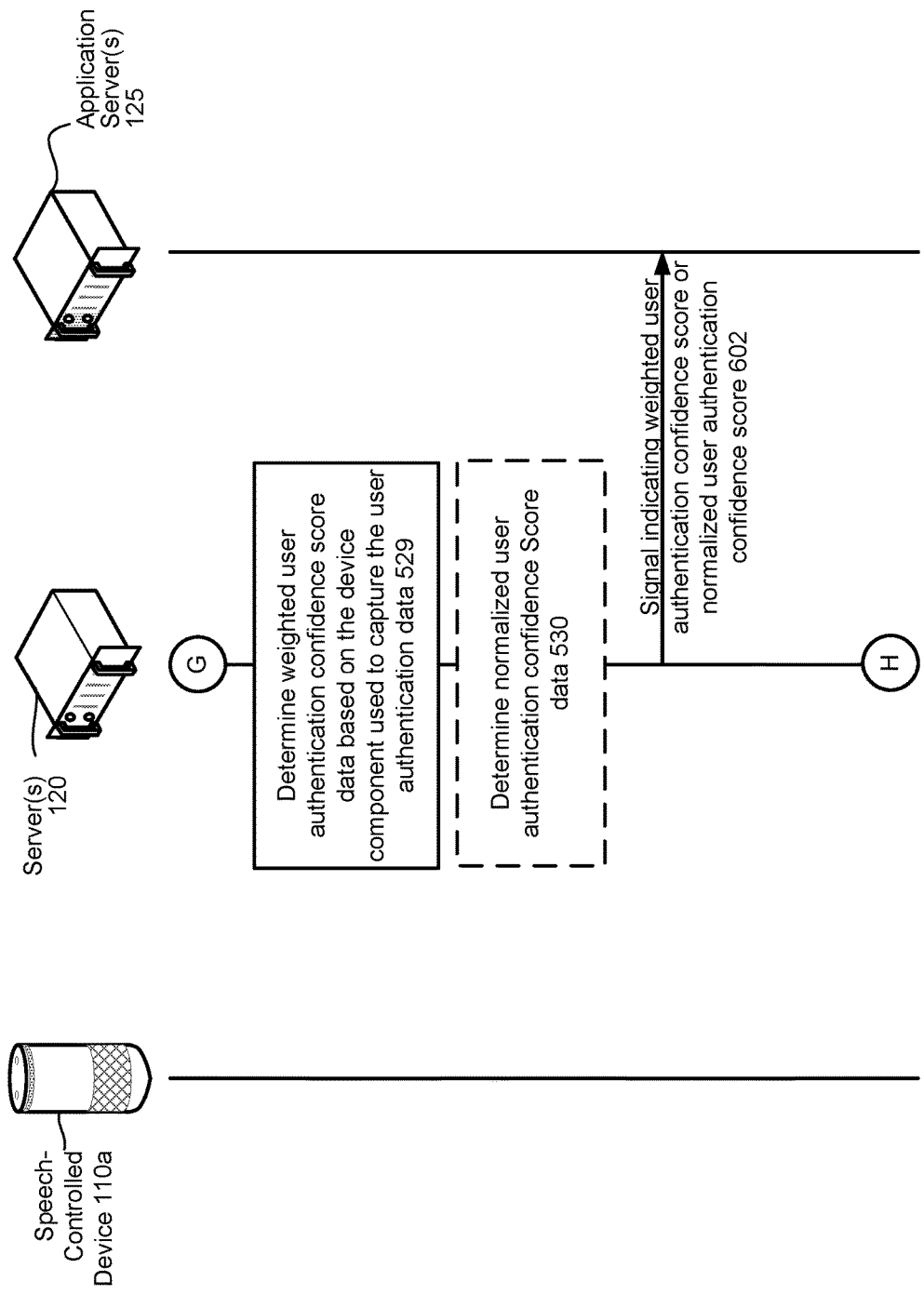

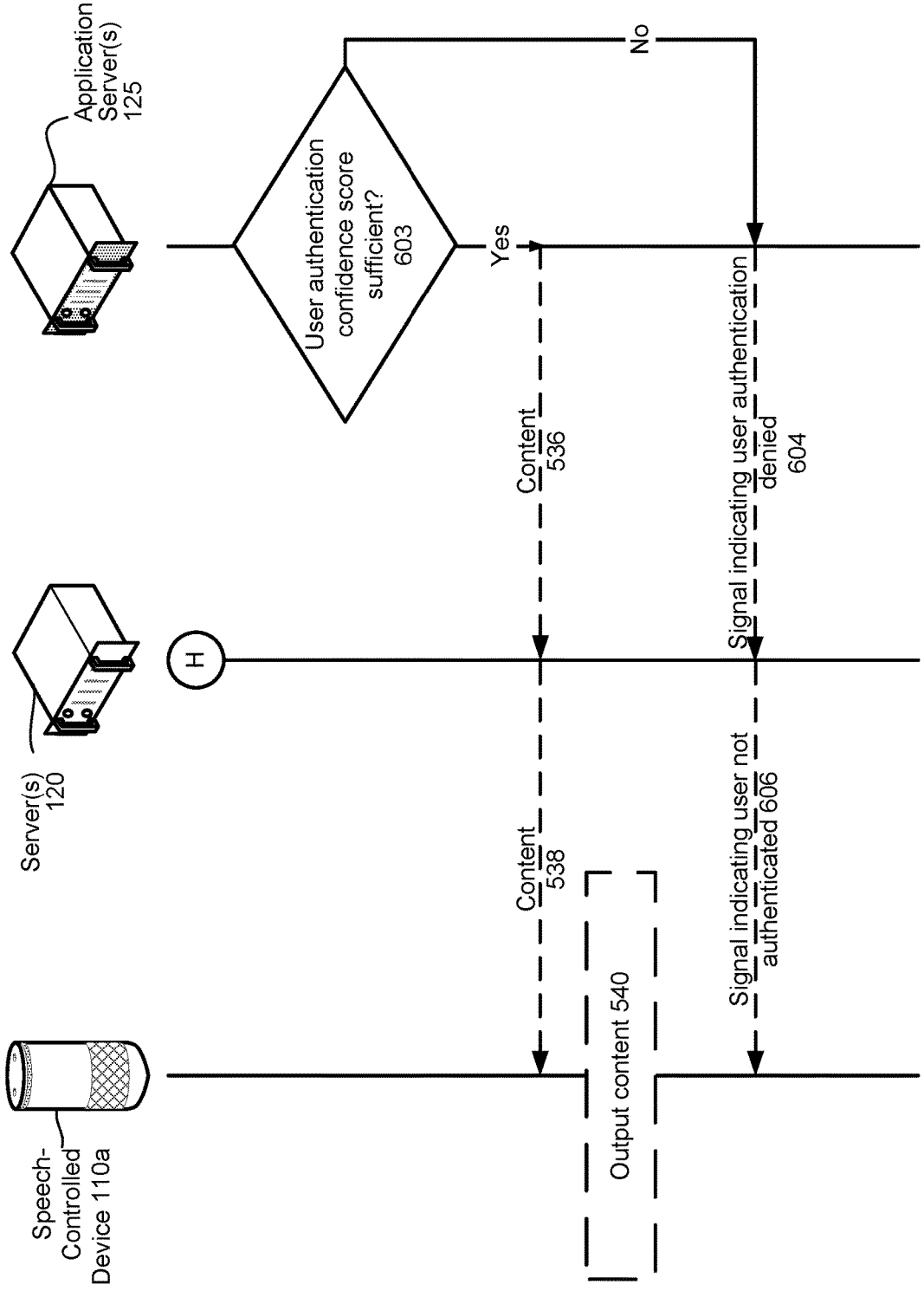

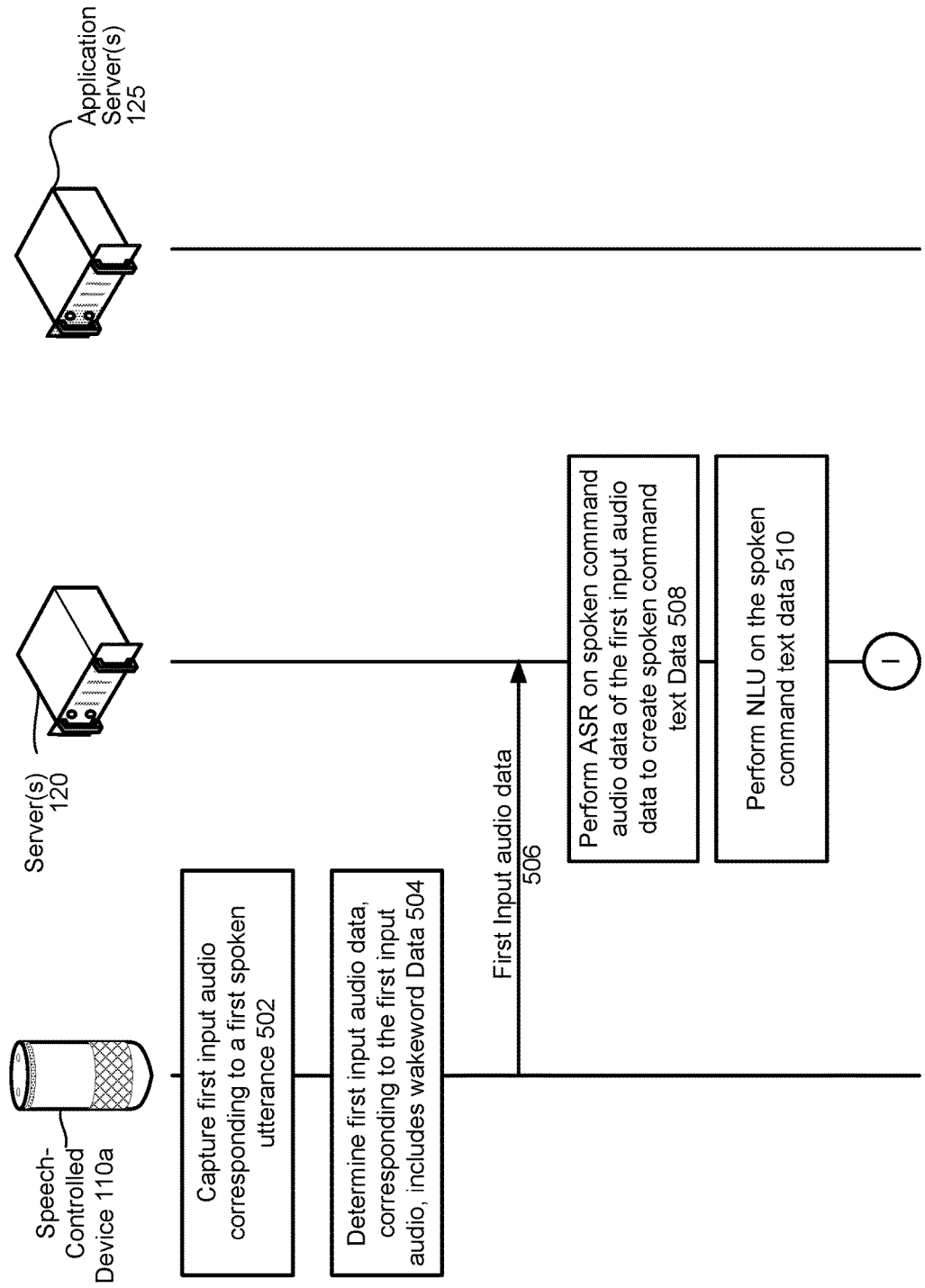

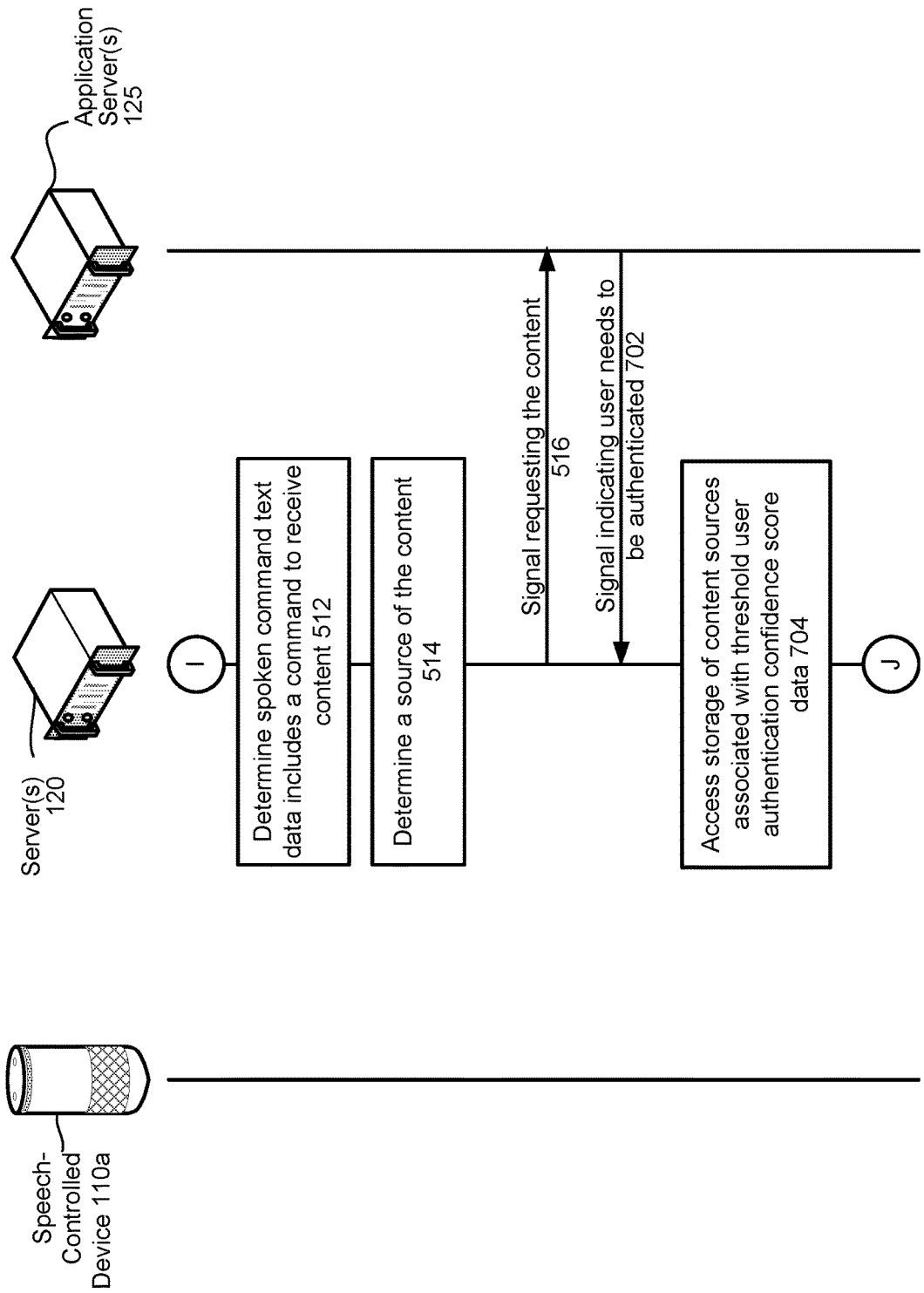

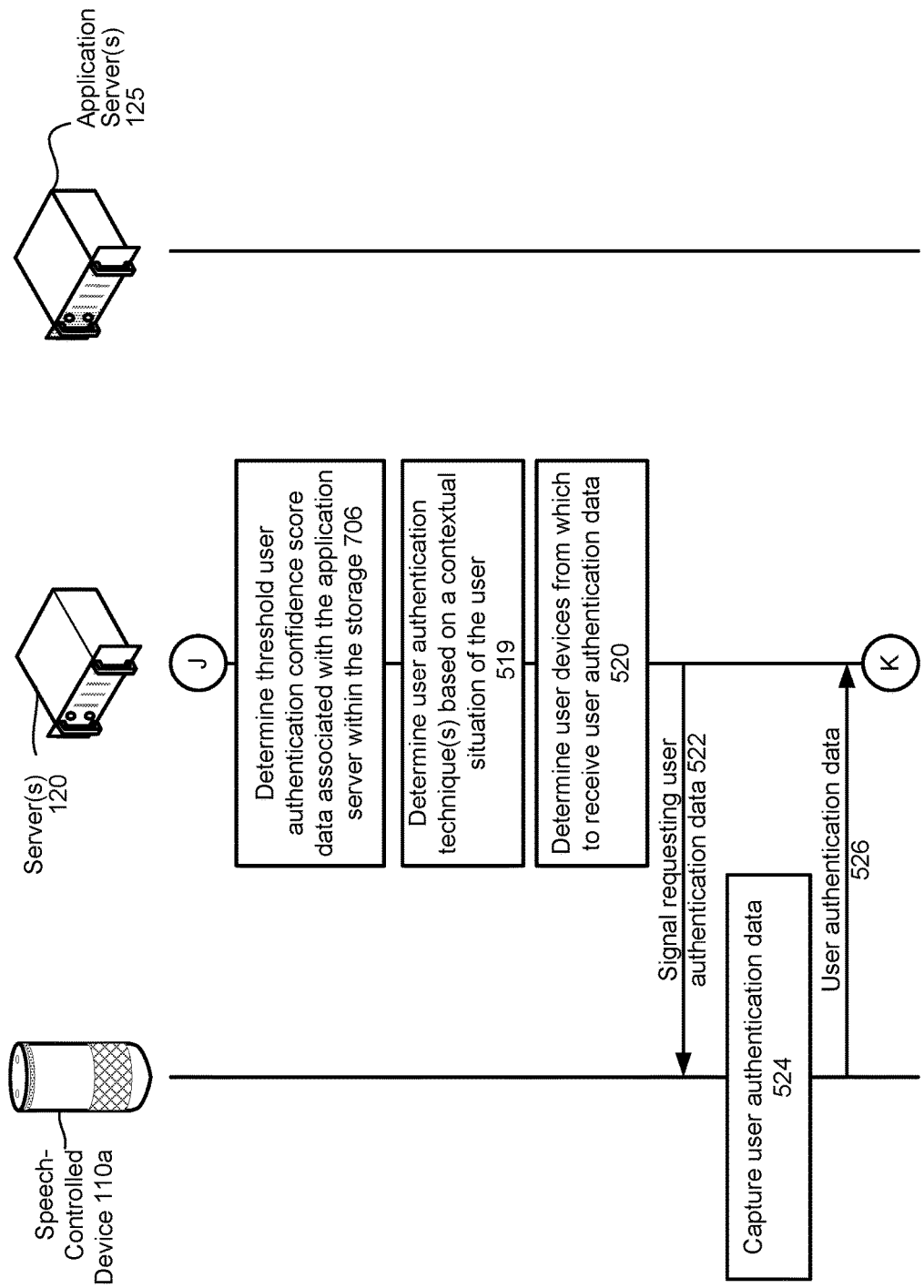

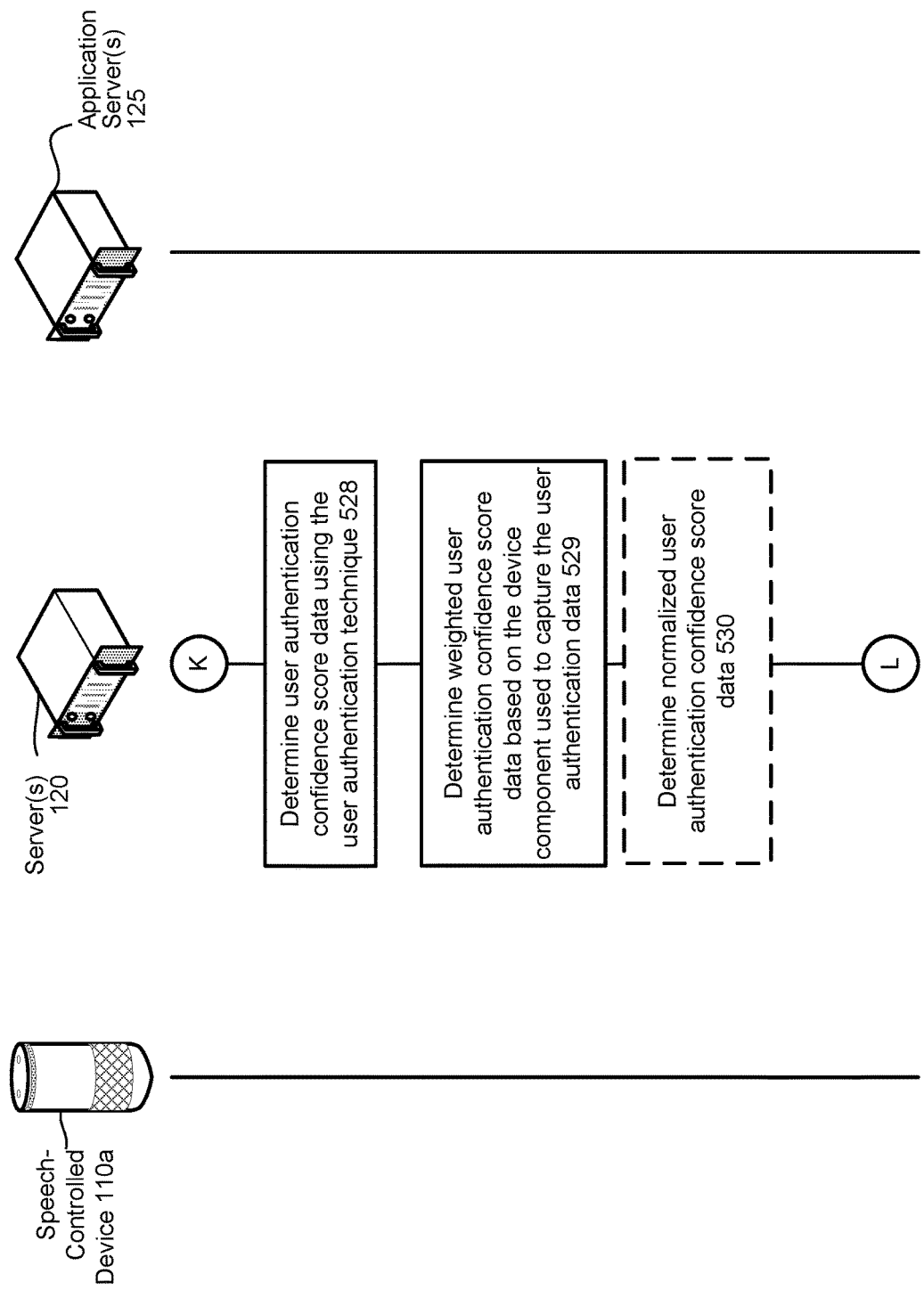

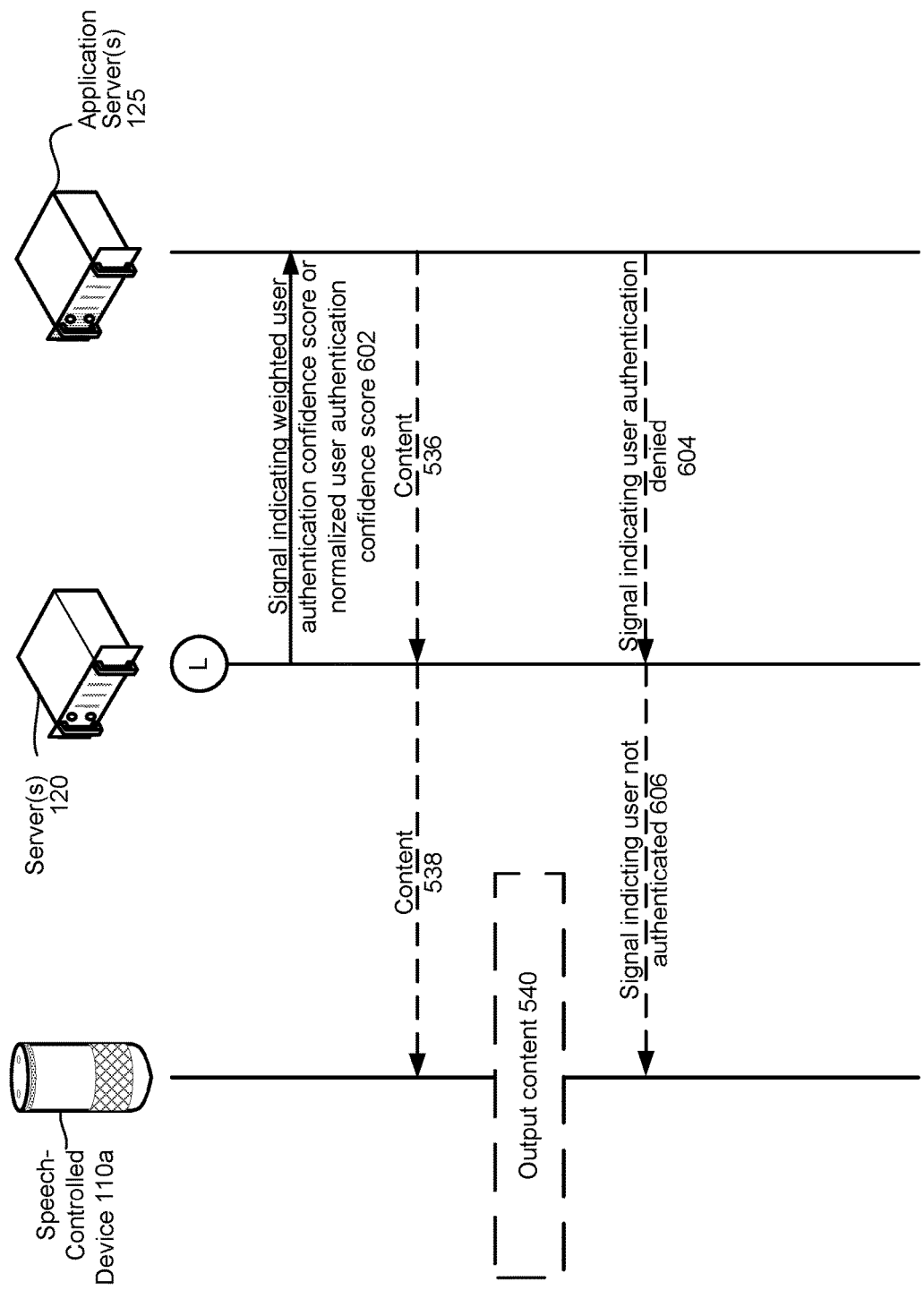

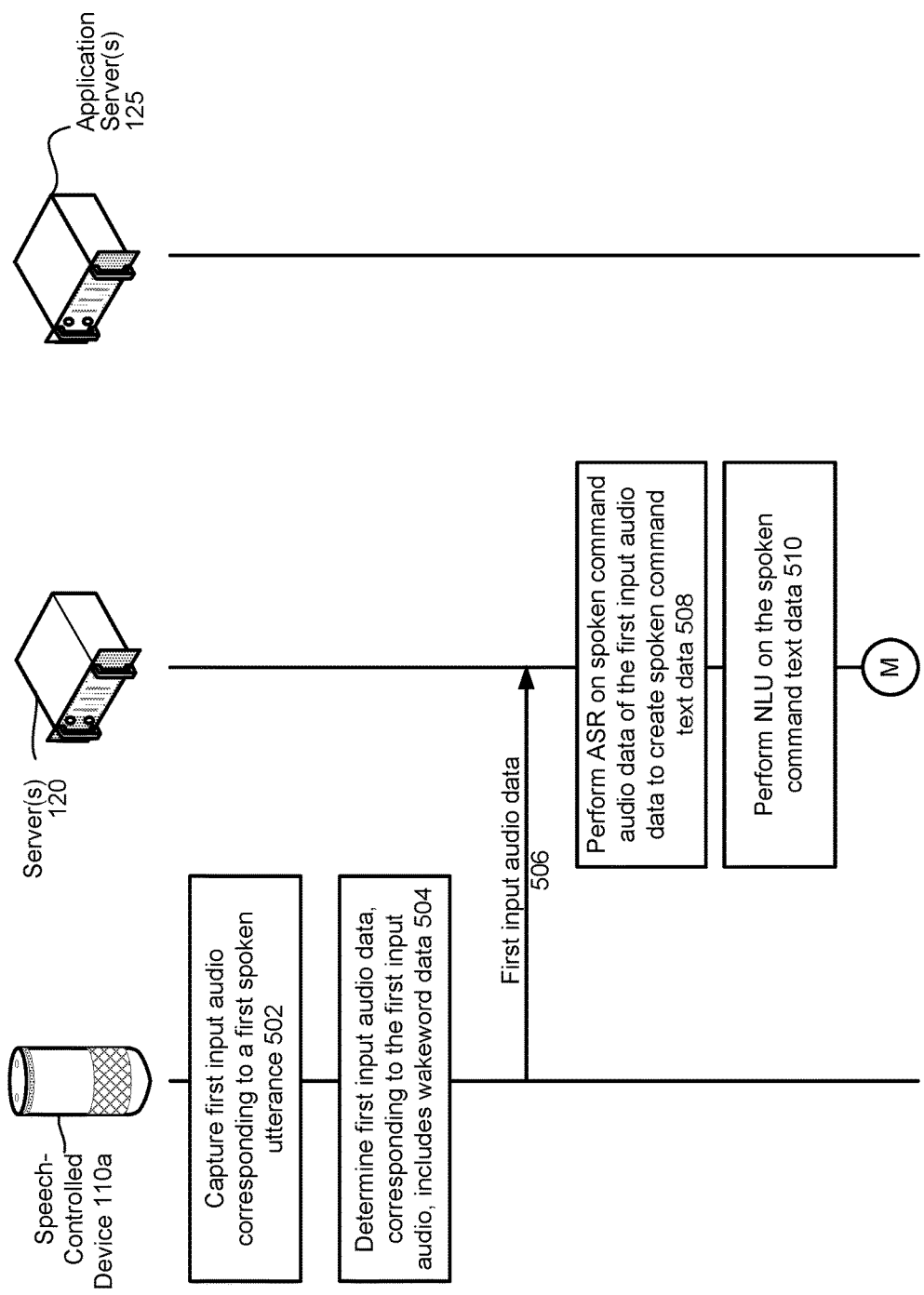

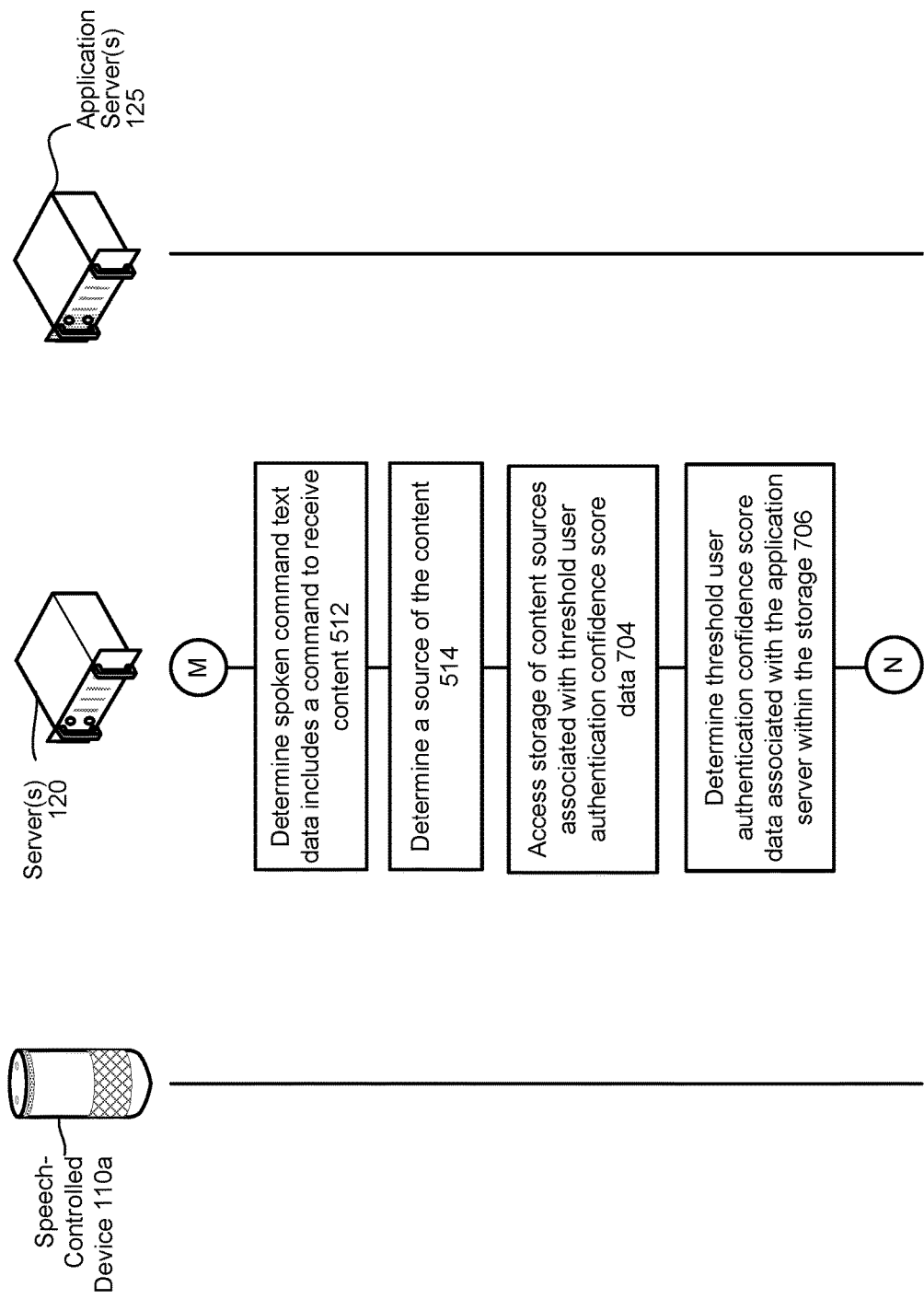

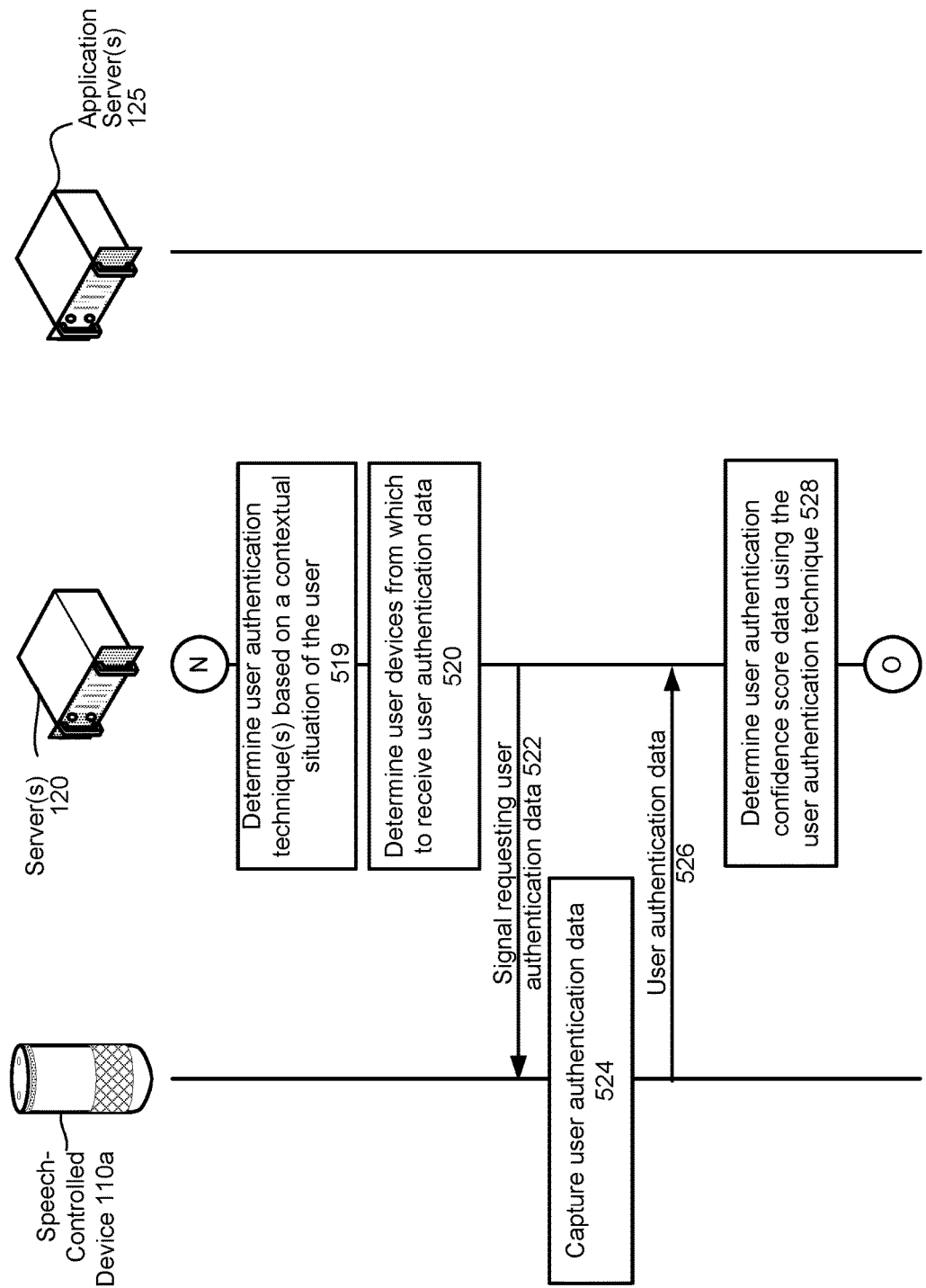

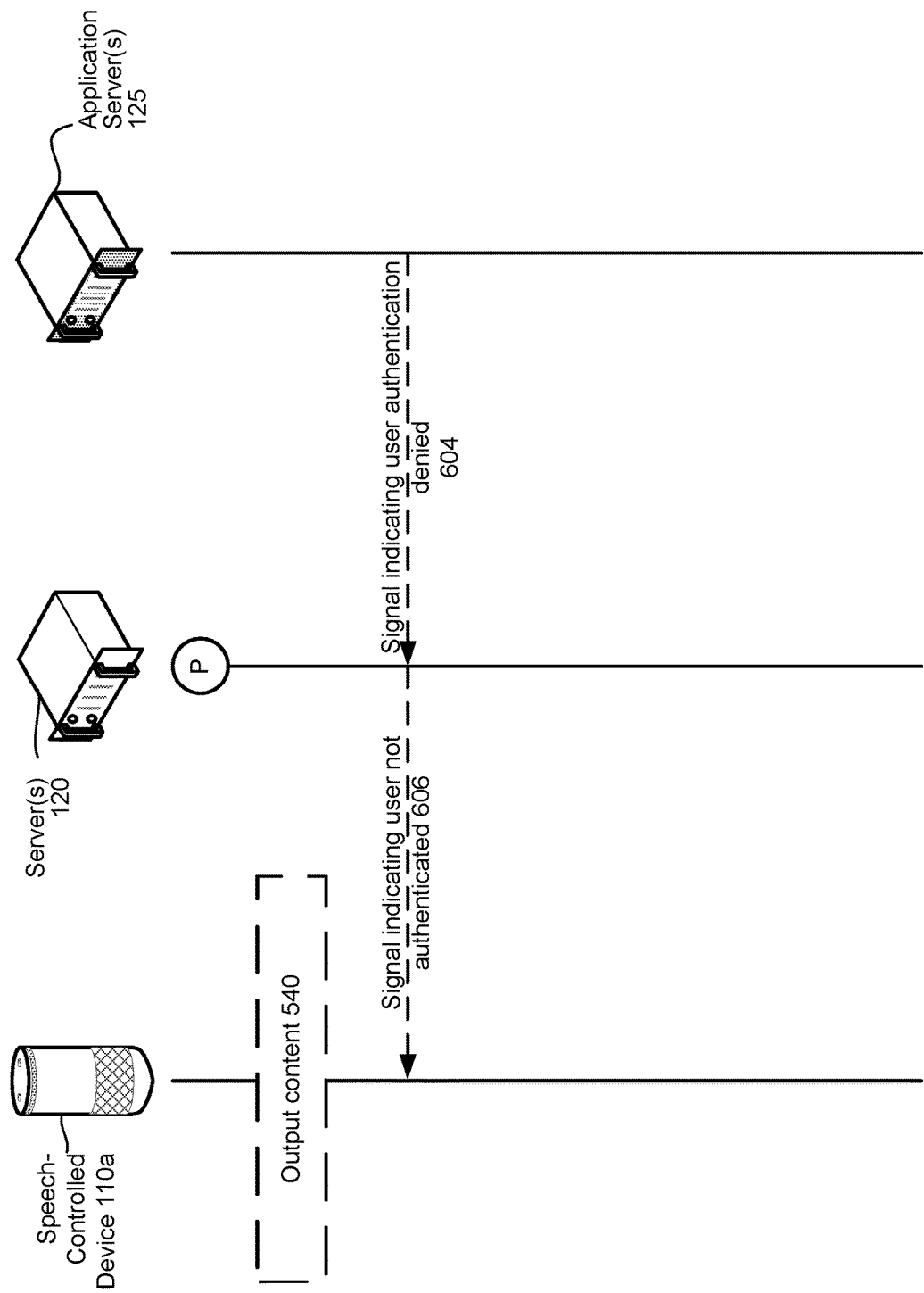

DYNAMIC USER AUTHENTICATION

BACKGROUND

Speech recognition systems have progressed to the point where humans can interact with computing devices using their voices. Such systems employ techniques to identify the words spoken by a human user based on the various qualities of a received audio input. Speech recognition combined with natural language understanding processing techniques enable speech-based user control of a computing device to perform tasks based on the user's spoken commands. The combination of speech recognition and natural language understanding processing techniques is referred to herein as speech processing. Speech processing may also involve converting a user's speech into text data which may then be provided to various text-based software applications.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIGS. 5A through 5E are a signal flow diagram illustrating dynamic user authentication according to embodiments of the present disclosure.

FIGS. 6A through 6E are a signal flow diagram illustrating dynamic user authentication according to embodiments of the present disclosure.

FIGS. 7A through 7E are a signal flow diagram illustrating dynamic user authentication according to embodiments of the present disclosure.

FIGS. 8A through 8E are a signal flow diagram illustrating dynamic user authentication according to embodiments of the present disclosure.

DETAILED DESCRIPTION

Automatic speech recognition (ASR) is a field of computer science, artificial intelligence, and linguistics concerned with transforming audio data associated with speech into text representative of that speech. Similarly, natural language understanding (NLU) is a field of computer science, artificial intelligence, and linguistics concerned with enabling computers to derive meaning from text input containing natural language. ASR and NLU are often used together as part of a speech processing system. Text-to-speech (TTS) is a field of concerning transforming textual data into audio data that is synthesized to resemble human speech.

User authentication is used by computing devices and systems to prevent unauthorized access to data. The device or system is often limited to one or more set types of user authentication that are used each time a user wants to access the device, system, or data stored therein. For example, user authentication may include a user inputting a "passcode," which may include letters, numbers, and combinations thereof. Alternatively or in addition, user authentication may include the user providing the device or system with biometric data (e.g., using a sensor to measure a physical characteristic of a user such as a heart rate, finger print, retina scan, etc.), random number authentication (using a second device such as a dongle), or other set technique. Thus, certain devices and systems are configured to authenticate users the same way each time a user tries to access the devices, systems, or data stored therein.

The present disclosure provides systems, methods, and devices that enable dynamic user authentication. Dynamic user authentication refers to the particular method, confidence, or other aspect of user authentication being tailored to each occurrence of a user attempting to access a device, system, or data stored therein. The user authentication may be based on a number of different factors. The type of user authentication may depend upon the source of data a user is trying to access. User authentication may also depend upon the type of data being accessed. Each source of data and/or type of data may have a threshold confidence associated therewith. The threshold confidence may be used by the device or system to determine one or more data input techniques to use to authenticate the user. User authentication may additionally be configured according to a contextual situation of a user. If the user is located a threshold distance away from a device, user authentication may involve analyzing speech captured by a microphone or microphone array and/or analyzing one or more image captured by a camera. If the user is, instead, located within a threshold distance of a device, user authentication may involve analyzing an input passcode and/or analyzing input biometric data. Various other combinations of user authentication techniques may be used.

Figure 1:
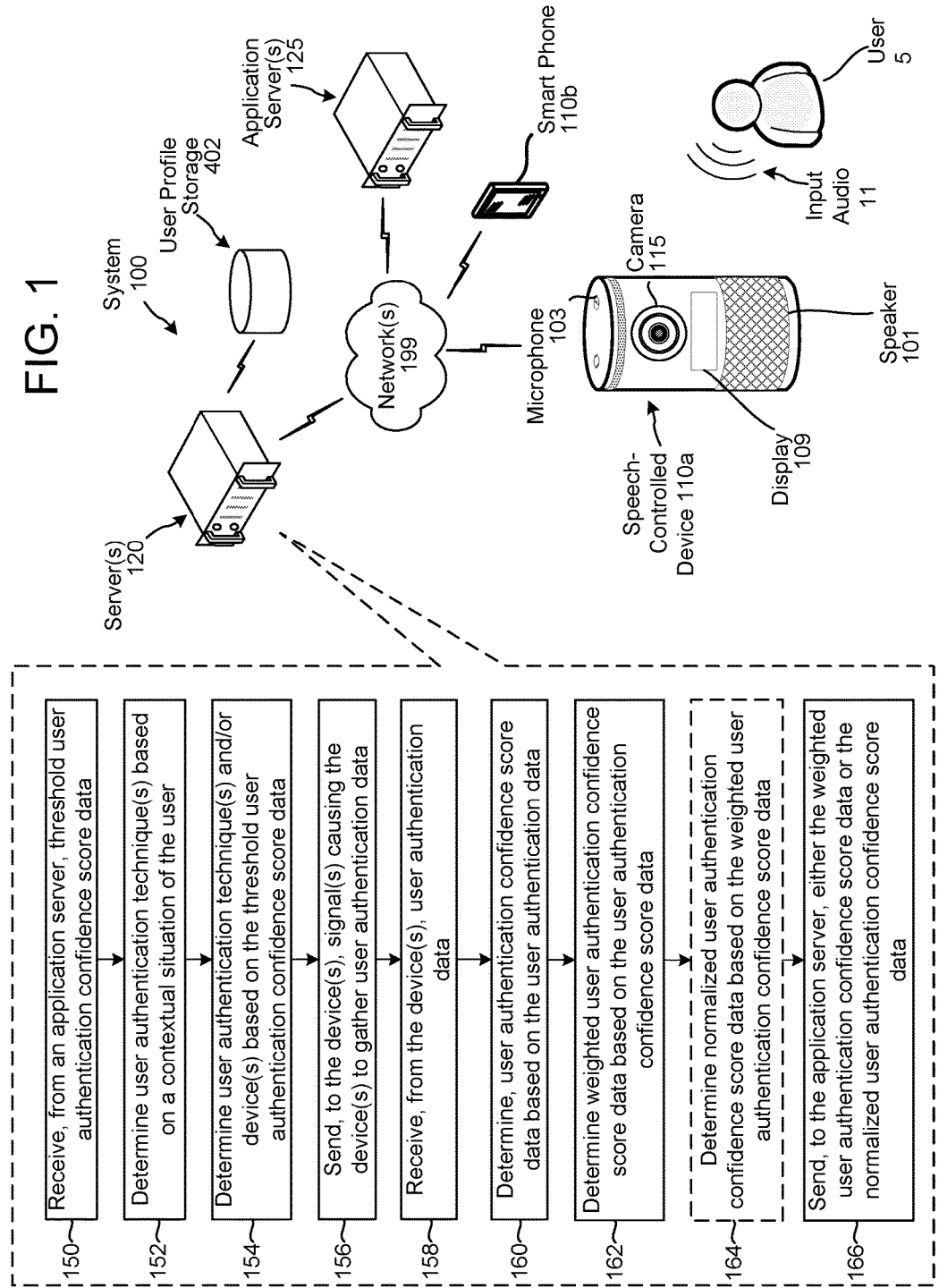
FIG. 1 illustrates a system for dynamically authenticating users according to embodiments of the present disclosure.

FIG. 1 shows a system 100 configured to dynamically authenticate users. Although the figures and discussion illustrate certain operational steps of the system 100 in a particular order, the steps described may be performed in a different order (as well as certain steps removed or added) without departing from the intent of the disclosure. As shown in FIG. 1, the system 100 may include one or more devices (e.g., a speech-controlled device 110a and a smart device such as a smart phone 110b) local to a user 5, one or more servers 120, and one or more application servers 125 connected across one or more networks 199. The server(s) 120 (which may be one or more different physical devices) may be capable of performing speech processing (e.g., ASR, NLU, command processing, etc.), TTS processing, and user authentication as described herein. A single server 120 may perform all speech processing, TTS processing, and user authentication. Alternatively, multiple servers 120 may combine to perform all speech processing, TTS processing, and user authentication. Further, the server(s) 120 may execute certain commands, such as answering spoken utterances of the user 5. In addition, certain speech detection or command execution functions may be performed by the speech-controlled device 110a.

As shown in FIG. 1, the speech-controlled device 110a may capture a spoken utterance (i.e., input audio 11) of the user 5 via a microphone 103 of the speech-controlled device 110a. The speech-controlled device 110a may send input audio data corresponding to the input audio 11 to the server 120 for processing. Alternatively, a separate microphone array (not illustrated) may capture the input audio 11. In an example, the microphone array is in direct communication with the speech-controlled device 110a such that when the microphone array captures the input audio 11, the microphone array sends input audio data corresponding to the input audio 11 to the speech-controlled device 110a. In another example, the microphone array is in indirect communication with the speech-controlled device 110a via a companion application of a mobile computing device, such as the smart phone 110b, a tablet, a laptop, etc. In this example, when the microphone array captures the input audio 11, the microphone array sends input audio data corresponding to the input audio 11 to the companion application, which forwards the input audio data to the speech-controlled device 110a. Upon receiving the input audio data from the microphone array, the speech-controlled device 110a may forward the input audio data to the server 120 for processing. In yet another example, the microphone array is in indirect communication with the server 120 via the companion application such that when the microphone array captures the input audio 11, the microphone array sends input audio data corresponding to the input audio 11 to the companion application, which forwards the input audio data to the server 120 for processing.

The server 120 receives, from either the speech-controlled device 110a or a companion application, the input audio data corresponding to the input audio 11. The server 120 processes the input audio data to determine spoken command data within the input audio data. The server 120 may process the spoken command data to determine a content source (e.g., an application server(s) 125) storing data responsive to the spoken command data. In an example, the input audio data may include spoken wakeword data and the spoken command data. When the input audio data contains such, the server 120 may determine the spoken wakeword data and the spoken command data, and may only process the spoken command data to determine the application server(s) 125.

The server 120 communicates with the application server(s) 125, and may receive (150) threshold user authentication confidence score data. Alternatively, the server 120 may receive the threshold user authentication confidence score data from a component internal to the system 100 (e.g., a command processor described herein). The server 120 may receive the data from the internal component when content responsive to the spoken command data is stored local to the system 100. The threshold user authentication confidence score data may represent a threshold user authentication confidence score the application server(s) 125 requires prior to providing access to data response to the spoken command data. Each application server 125 (e.g., content source) may have a unique threshold user authentication confidence score that must be met or exceeded. For example, a banking application server 125 may have a first threshold user authentication confidence score, an email application server 125 may have a second threshold user authentication confidence score, etc. Moreover, a single application server 125 may have various threshold confidence score depending upon the data to be accessed. For example, a banking application server 125 may have a first threshold user authentication confidence score that must be satisfied to access banking account information, a second threshold user authentication confidence score that must be satisfied to access to data corresponding to when the bank is open for business, etc. The threshold may be specific to the data being accessed. For instance, according to the above example, the threshold needed to access the bank account information may be higher than the threshold to access the hours of operation of the bank, based on the bank account information being more confidential/classified/private than the hours of operation. If the server 120 authenticates the user to a lower threshold of an application server 120, and the user thereafter requests content associated with a higher confidence score threshold, the server 120 may either perform a separate user authentication to satisfy the higher threshold, or may simply activate additional user authentication, and use the original and additional user authentications together to satisfy the higher threshold. Thus, the application server(s) 125 may inform the server 120 that protected data from the application server(s) 125 may only be provided to the server 120 upon confirmation that the server 120 is sufficiently confident that the user for the transaction matches an approved user.

The server 120 may determine (152) one or more user authentication techniques based on a contextual situation of the user 5. The server 120 may receive data, from various devices local to the user 5 (e.g., the speech-controlled device 110a and the smart phone 110b), that indicates a "situation" of the user 5. For example, the data may indicate a proximity of the user 5 to the device(s), may indicate whether multiple individuals are located proximate to the device(s), may indicate a noise level of captured audio, a geographic location of a user, etc. If only one individual is within a field of view of a camera 115 of the speech-controlled device 110a, but the individual is located a threshold distance away from the speech-controlled device 110a, the server 120 may determine a user authentication technique wherein the microphone 103 of the speech-controlled device 110a (or a microphone array) captures speech of the individual and/or a camera 115 of the speech controlled device 110a (or a separate camera) captures of one or more images including representations of the individual. Speech processing may be performed on audio data corresponding to the captured speech to authenticate the user's voice. Image processing may be performed on image data or video data corresponding to the captured image(s) to authenticate the user's features/appearance. If multiple individuals are located proximate to the devices(s) (e.g., as determined by multiple individuals being located within a field of view of the camera 115 or based on multiple individuals' voices being detected in audio data captured by the microphone 103), the server 120 may determine a user authentication technique wherein an individual provides a passcode, biometric content, or other content that may not be overheard/overseen by the other individuals to the smart phone 110b (or other device such as a connected wearable device like smart watch 110c shown in FIG. 11) via a touch interface, biometric sensor, and/or other interface. In another example, a user profile may indicate an alphanumeric passcode. An illustrative authentication technique may solicit only a portion (e.g., the third digit) of the alphanumeric passcode, or only a portion of other authentication data (such as a third word of a pass phrase, part of an authentication gesture, etc.). This may be beneficial if it is determined that multiple individuals are present because it allows the user to provide useful authentication data without having the user divulge its passcode to unauthorized individuals. It should be appreciated that the above examples of determining user authentication techniques are merely illustrative, and that the system may determine user authentication techniques based on various other situations and/or circumstances.

Once the server 120 has determined the one or more user authentication techniques based on a contextual situation of the user 5, the server 120 may determine (154) one or more of those user authentication techniques based on the threshold user authentication confidence score data received from the application server(s) 125. Each user authentication technique may be associated with one or more devices capable of capturing data used to perform the respective user authentication technique. Each particular pairing of a user authentication technique and associated device may be associated with a maximum weighted confidence score. That is, for certain tasks the system may wish to be more confident that the user is authenticated and for other tasks, where user identity may be less important, the system may allow access even if the system is less confident that the user is authenticated, thus allowing a tradeoff between user authentication confidence and ease of user access. The server 120 may determine a single user authentication technique (of the previously determined one or more user authentication techniques) and associated device capable of generating a weighted user authentication confidence score that satisfies the application server(s) 125 provided threshold user authentication confidence score. Alternatively, the server 120 may determine multiple user authentication techniques and associated devices that, when their respective weighted user authentication confidence scores are considered together (either individually or in a combined manner), satisfy the application server(s) 125 provided threshold user authentication confidence score. The weighted user authentication confidence scores may be combined using various techniques as described below and as known in the art.

The server 120 may determine the user authentication technique(s) and associated device(s) based on the speech-controlled device 110a from which the original audio data including the spoken command data was received. The speech-controlled device 110a may be associated with one or more user accounts. The one or more user accounts may indicate various user devices associated with respective types of data capable of being gathered. For example, a user account may be associated with a speech-controlled device that may capture audio and/or image data, a wearable (e.g., a smart watch) that may capture a pulse, a fingerprint scanner, a retina scanner, a keyboard that may capture a password, a sensor for waiving a dongle in front of, etc. As such, the server 120 may determine the user authentication technique(s) and associated device(s) based on those represented in the user account(s) within which the speech-controlled device 110a is indicated.

Once the server 120 has determined the authentication technique(s) and associated device(s), the server 120 may send (156) a signal to each determined device, with the signal causing each device to gather user authentication data. The signal may include TTS speech (e.g., asking the user to enter their password in a companion application), the activation of a light indicating more information is needed from the user 5, etc. The server 120 receives (158) user authentication data from the device(s). The user authentication data may be audio data including speech of a user, image data or video data including one or more images including a representation of an individual, passcode data, biometric data, etc. The speech may be a specific pass phrase from the user (e.g., "my voice is my passport, verify me").

The server 120 may determine (160) respective confidence score data based on user authentication data received from each device. The user authentication confidence score data may indicate a user authentication confidence score within a range (e.g., 0-100, 0-1000, etc.). For example, if the user authentication data is audio data, the server 120 may determine a confidence score by comparing speech characteristics in the received audio data to stored speech characteristics associated with a user profile of the device from which the audio data was received. In another example, if the authentication data is image data or video data, the server 120 may determine a confidence score by comparing feature vectors of a representation of an individual in the received image data or video data to stored feature vectors associated with a user profile of the device from which the image data or video data was received. In a further example, if the authentication data is passcode data or biometric data, the server 120 may determine a confidence score by comparing the received passcode data or biometric data to stored passcode data or biometric data associated with a user profile of the device from which the passcode data or biometric data is received.

The server 120 may determine (162) respective weighted user authentication confidence score data for each determined user authentication confidence score data. Each user authentication technique (e.g., speech user authentication using audio data, facial recognition user authentication using image data or video data, passcode user authentication, biometric user authentication, etc.) and/or each data capture component (e.g., microphone, camera, touch sensor, biometric sensor, etc.) of a device may be associated with a respective weight. Each weight may indicate a reliability of the associated user authentication technique and/or data received from the data capture component.

If the server 120 determines weighted user authentication confidence score data for multiple user authentication techniques and/or multiple devices, the server 120 may determine (164) normalized user authentication confidence score data based on the weighted user authentication confidence score data of each user authentication technique and/or device.

The server 120 may then send (166) either the determined weighted user authentication confidence score data (if only one user authentication technique is used) or the normalized user authentication confidence score data (if more than one user authentication technique is used) to the application server(s) 125.

The description herein states the input data may originally captured as audio by the speech-controlled device 110a. However, one skilled in the art should appreciated that input data may take different forms. For example, the input data may be tactile data (e.g., indicating the pressing of a virtual or physical button). Other input data/modalities should also be appreciated.

While it is described herein that the system 100 may process command utterances corresponding to requests for content (e.g., "get my bank account credit card statement"), one skilled in the art should appreciated that the present disclosure is not so limited. For example, the system 100 may also process requests/invocations to perform actions (e.g., "book me a ticket to the next Adele concert," "open the front door," etc.). Thus the utterances may request execution of a particular command or performance of a specific action. Thus all the teachings herein regarding requesting content apply equally to executing commands and performing actions.

While the present disclosure describes techniques for dynamically authenticating a user with respect to a specific spoken utterance, it should also be appreciated that the herein disclosed techniques may be used to authenticate a user with respect to authorization of a system. For example, the dynamic authentication techniques of the present disclosure may be used to authenticate a user and, therefrom, the system may determine what the user is authorized to access (irrespective of a specific spoken utterance). Authorization refers to a system controlling access to resources based on a successful authentication of a user.

It should be appreciated that the user authentication confidence score threshold that must be satisfied in order to access certain data may be defined/set by a variety of entities. The entity storing the data may set the user authentication confidence score threshold that must be met or exceeded in order to access the data. The user may alternatively set the user authentication confidence score threshold. For example, a user profile (described in detail herein) may include data indicating access to a social media account may require facial recognition with a confidence score of X. Other data and user preferred confidence score thresholds may also be used.

Figure 2:
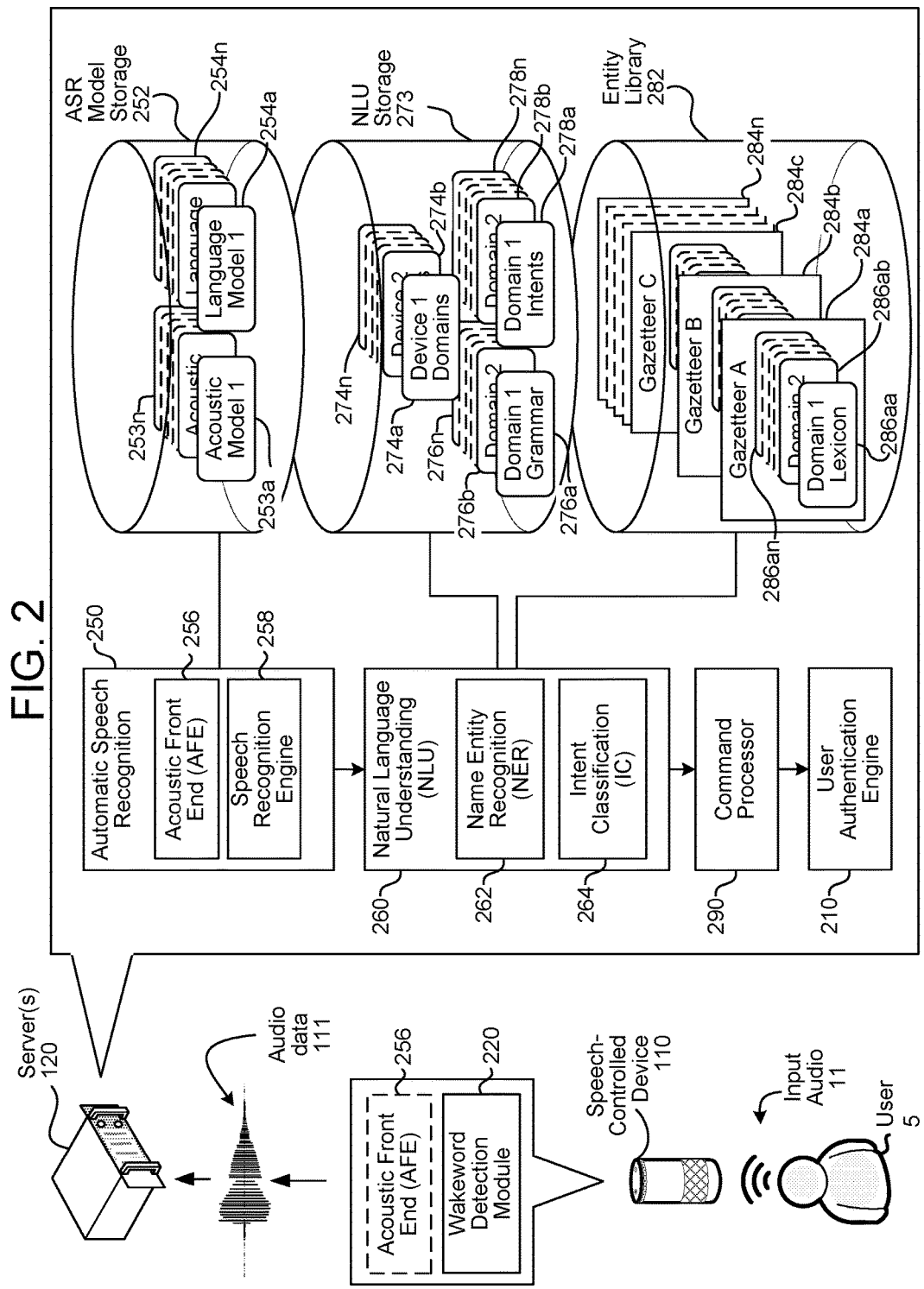
FIG. 2 is a conceptual diagram of how a spoken utterance may be processed according to embodiments of the present disclosure.

Further details of the system 100 configured to dynamically authenticate users are explained below, following a discussion of the overall speech processing system of FIG. 2. The system 100 may operate using various speech processing components as described in FIG. 2. FIG. 2 is a conceptual diagram of how a spoken utterance is processed. The various components illustrated may be located on a same or different physical devices. Communication between various components illustrated in FIG. 2 may occur directly or across a network 199. An audio capture component, such as the microphone 103 of the speech-controlled device 110a (or other device), captures input audio 11 corresponding to a spoken utterance. The device 110a, using a wakeword detection module 220, then processes audio data corresponding to the input audio 11 to determine if a keyword (such as a wakeword) is detected in the audio data. Following detection of a wakeword, the device 110a sends audio data 111 corresponding to the utterance, to a server 120 that includes an ASR module 250. The audio data 111 may be output from an acoustic front end (AFE) 256 located on the device 110a prior to transmission. Or the audio data 111 may be in a different form for processing by a remote AFE 256, such as the AFE 256 located with the ASR module 250.

The wakeword detection module 220 works in conjunction with other components of the device 110a, for example a microphone (not illustrated) to detect keywords in audio data corresponding to the input audio 11. For example, the device 110a may convert input audio 11 into audio data, and process the audio data with the wakeword detection module 220 to determine whether speech is detected, and if so, if the audio data comprising speech matches an audio signature and/or model corresponding to a particular keyword.

The device 110a may use various techniques to determine whether audio data includes speech. Some embodiments may apply voice activity detection (VAD) techniques. Such techniques may determine whether speech is present in input audio based on various quantitative aspects of the input audio, such as a spectral slope between one or more frames of the input audio; energy levels of the input audio in one or more spectral bands; signal-to-noise ratios of the input audio in one or more spectral bands; or other quantitative aspects. In other embodiments, the device 110a may implement a limited classifier configured to distinguish speech from background noise. The classifier may be implemented by techniques such as linear classifiers, support vector machines, and decision trees. In still other embodiments, Hidden Markov Model (HMM) or Gaussian Mixture Model (GMM) techniques may be applied to compare the input audio to one or more acoustic models in speech storage, which acoustic models may include models corresponding to speech, noise (such as environmental noise or background noise), or silence. Still other techniques may be used to determine whether speech is present in the input audio.

Once speech is detected in the input audio, the device 110a may use the wakeword detection module 220 to perform wakeword detection to determine when a user intends to speak a command to the device 110a. This process may also be referred to as keyword detection, with the wakeword being a specific example of a keyword. Specifically, keyword detection is typically performed without performing linguistic analysis, textual analysis, or semantic analysis. Instead, incoming audio (or audio data) is analyzed to determine if specific characteristics of the audio match preconfigured acoustic waveforms, audio signatures, or other data to determine if the incoming audio "matches" stored audio data corresponding to a keyword.

Thus, the wakeword detection module 220 may compare audio data to stored models or data to detect a wakeword. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds HMMs for each wakeword and non-wakeword speech signals respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating a hybrid deep neural network (DNN)-HMM decoding framework. In another embodiment the wakeword spotting system may be built on DNN/recursive neural network (RNN) structures directly, without HMM involved. Such a system may estimate the posteriors of wakewords with context information, either by stacking frames within a context window for DNN, or using RNN. Follow-on posterior threshold tuning or smoothing is applied for decision making. Other techniques for wakeword detection, such as those known in the art, may also be used.

Once the wakeword is detected, the local device 110a may "wake" and begin transmitting audio data 111 corresponding to input audio 11 to the server(s) 120 for speech processing (e.g., for purposes of executing a command in the speech). The audio data 111 may include data corresponding to the wakeword, or the portion of the audio data corresponding to the wakeword may be removed by the local device 110a prior to sending the audio data 111 to the server 120.

Upon receipt by the server(s) 120, an ASR module 250 may convert the audio data 111 into text data. The ASR module 250 transcribes the audio data 111 into text data representing words of speech contained in the audio data 111. The text data may then be used by other components for various purposes, such as executing system commands, inputting data, etc. A spoken utterance in the audio data 111 is input to a processor configured to perform ASR, which then interprets the spoken utterance based on a similarity between the spoken utterance and pre-established language models 254 stored in an ASR model knowledge base (i.e., ASR model storage 252). For example, the ASR module 250 may compare the audio data 111 with models for sounds (e.g., subword units, such as phonemes) and sequences of sounds to identify words that match the sequence of sounds spoken in the spoken utterance of the audio data 111.

The different ways a spoken utterance may be interpreted (i.e., the different hypotheses) may each be assigned a probability or a confidence score representing a likelihood that a particular set of words matches those spoken in the spoken utterance. The confidence score may be based on a number of factors including, for example, a similarity of the sound in the spoken utterance to models for language sounds (e.g., an acoustic model 253 stored in the ASR model storage 252), and a likelihood that a particular word that matches the sound would be included in the sentence at the specific location (e.g., using a language model 254 stored in the ASR model storage 252). Thus, each potential textual interpretation of the spoken utterance (i.e., hypothesis) is associated with a confidence score. Based on the considered factors and the assigned confidence score, the ASR module 250 outputs the most likely text recognized in the audio data 111. The ASR module 250 may also output multiple hypotheses in the form of a lattice or an N-best list with each hypothesis corresponding to a confidence score or other score (e.g., such as probability scores, etc.).

The device or devices including the ASR module 250 may include an AFE 256 and a speech recognition engine 258. The AFE 256 transforms the audio data 111 into data for processing by the speech recognition engine 258. The speech recognition engine 258 compares the speech recognition data with acoustic models 253, language models 254, and other data models and information for recognizing the speech conveyed in the audio data 111. The AFE 256 may reduce noise in the audio data 111 and divide the digitized audio data 111 into frames representing time intervals for which the AFE 256 determines a number of values (i.e., features) representing qualities of the audio data 111, along with a set of those values (i.e., a feature vector or audio feature vector) representing features/qualities of the audio data 111 within each frame. Many different features may be determined, as known in the art, and each feature represents some quality of the audio data 111 that may be useful for ASR processing. A number of approaches may be used by the AFE 256 to process the audio data 111, such as mel-frequency cepstral coefficients (MFCCs), perceptual linear predictive (PLP) techniques, neural network feature vector techniques, linear discriminant analysis, semi-tied covariance matrices, or other approaches known to those skilled in the art.

The speech recognition engine 258 may process data output from the AFE 256 with reference to information stored in the ASR model storage 252. Alternatively, post-AFE processed data (e.g., feature vectors) may be received by the device executing ASR processing from another source besides the internal AFE 256. For example, the speech-controlled device 110a may process audio data 111 into feature vectors (e.g., using an on-device AFE 256) and transmit the feature vector data to the server 120 across the network 199 for ASR processing. Feature vector data may arrive at the server 120 encoded, in which case it may be decoded prior to processing by the processor executing the speech recognition engine 258.

The speech recognition engine 258 attempts to match received feature vectors to language phonemes and words as known in the stored acoustic models 253 and language models 254. The speech recognition engine 258 computes recognition scores for the feature vectors based on acoustic information and language information. The acoustic information is used to calculate an acoustic score representing a likelihood that the intended sound represented by a group of feature vectors matches a language phoneme. The language information is used to adjust the acoustic score by considering what sounds and/or words are used in context with each other, thereby improving a likelihood that the ASR module 250 will output speech results that make sense grammatically.

The speech recognition engine 258 may use a number of techniques to match feature vectors to phonemes, for example using HMMs to determine probabilities that feature vectors may match phonemes. Sounds received may be represented as paths between states of the HMM and multiple paths may represent multiple possible text matches for the same sound.

Following ASR processing, the ASR results may be sent by the speech recognition engine 258 to other processing components, which may be local to the device performing ASR and/or distributed across the network(s) 199. For example, ASR results in the form of a single textual representation of the speech, an N-best list including multiple hypotheses and respective scores, lattice, etc. may be sent to a server, such as the server 120, for natural language understanding (NLU) processing, such as conversion of the text data into commands for execution, either by the speech-controlled device 110a, by the server 120, or by another device (e.g., a server running a search engine, an application server(s) 125, etc.)

The device performing NLU processing (e.g., the server 120) may include various components, including potentially dedicated processor(s), memory, storage, etc. The device performing NLU processing may include a dedicated NLU module/component 260, which may include a named entity recognition (NER) module 262, and intent classification (IC) module 264. The device performing NLU processing may additionally include NLU storage 273, and a knowledge base (not illustrated). The knowledge base is a database or other information storage that may include information about entities that may be used in resolving spoken utterances. The NLU module 260 may also utilize gazetteer information 284 stored in an entity library storage 282. The knowledge base and/or gazetteer information 284 may be used for entity resolution, for example matching ASR results with different entities (e.g., song titles, contact names, etc.). Gazetteers 284 may be linked to users (e.g., a particular gazetteer may be associated with a specific user's music collection), may be linked to certain domains (e.g., shopping), or may be organized in a variety of other ways.

The NLU module 260 takes text data (e.g., output from the ASR module 250 based on the input audio data 111) and attempts to make a semantic interpretation of the text data. That is, the NLU module 260 determines the meaning behind the text data based on the individual words and then implements that meaning. The NLU module 260 interprets a text string to derive an intent or a desired action from the user as well as the pertinent pieces of information in the text data that allow a device (e.g., the speech-controlled device 110a, the server 120, an application server(s) 125, etc.) to complete that action. For example, if a spoken utterance is processed using the ASR module 250, which outputs the text data "call mom", the NLU module 260 may determine the user intended to activate a telephone in his/her device and to initiate a call with a contact matching the entity "mom."

The NLU module 260 may process several textual inputs related to the same utterance. For example, if the ASR module 250 outputs N text segments (e.g., as part of an N-best list), the NLU module 260 may process all N outputs to obtain NLU results.

The NLU module 260 may be configured to parse and tag to annotate text data as part of NLU processing. For example, for the text data "call mom," "call" may be tagged as a command (e.g., to execute a phone call) and "mom" may be tagged as a specific entity and target of the command. In addition, the telephone number for the entity corresponding to "mom" stored in a contact list may be included in the annotated NLU results.

To correctly perform NLU processing of speech input, the NLU module 260 may be configured to determine a "domain" of the utterance so as to determine and narrow down which services offered by an endpoint device (e.g., the server 120, the speech-controlled device 110a, an application server(s) 125) may be relevant. For example, an endpoint device may offer services relating to interactions with a telephone service, a contact list service, a calendar/scheduling service, a music player service, etc. Words in text data may implicate more than one service, and some services may be functionally linked (e.g., both a telephone service and a calendar service may utilize data from the contact list).

The NER module 262 receives an utterance in the form of ASR results and attempts to identify relevant grammars and lexical information that may be used to construe meaning. To do so, the NER module 262 may begin by identifying potential domains that may relate to the received utterance. The NLU storage 273 includes a database of domains 274 associated with specific devices. For example, the speech-controlled device 110a may be associated with domains for music, telephony, calendaring, contact lists, and device-specific communications. In addition, the entity library 282 may include database entries about specific services on a specific device, either indexed by Device ID, User ID, Household ID, or some other indicator.

A domain may represent a discrete set of activities having a common theme, such as "shopping", "music", "calendaring", etc. As such, each domain may be associated with a particular language model and/or grammar database 276, a particular set of intents/actions 278, and/or a particular personalized lexicon 286. Each gazetteer 284 may include domain-indexed lexical information associated with a particular user and/or device. For example, the Gazetteer A 284a includes domain-index lexical information 286aa to 286an. A user's music-domain lexical information might include album titles, artist names, and song names, for example, whereas a user's contact-list lexical information might include the names of contacts. Since every user's music collection and contact list is presumably different, this personalized information improves entity resolution.

An utterance may be processed applying the rules, models, and information applicable to each identified domain. For example, if an utterance potentially implicates both communications and music, the utterance will be NLU processed using the grammar models and lexical information for communications, and will also be processed using the grammar models and lexical information for music. The responses to the spoken utterance produced by each set of models is scored, with the overall highest ranked result from all applied domains being ordinarily selected to be the correct result.

An IC module 264 parses the utterance to determine an intent(s) for each identified domain, where the intent(s) corresponds to the action to be performed that is responsive to the spoken utterance. Each domain is associated with a database 278 of words linked to intents. For example, a music intent database may link words and phrases such as "quiet," "volume off," and "mute" to a "mute" intent. The IC module 264 identifies potential intents for each identified domain by comparing words in the utterance to the words and phrases in the intents database 278.

In order to generate a particular interpreted response, the NER module 262 applies the grammar models and lexical information associated with the respective domain. Each grammar model 276 includes the names of entities (i.e., nouns) commonly found in speech about the particular domain (i.e., generic terms), whereas the lexical information 286 from the gazetteer 284 is personalized to the user and/or the device. For instance, a grammar model 276 associated with a shopping domain may include a database of words commonly used when people discuss shopping.

The intents identified by the IC module 264 are linked to domain-specific grammar frameworks (included in 276) with "slots" or "fields" to be filled. For example, if "play music" is an identified intent, a grammar framework(s) may correspond to sentence structures such as "Play {Artist Name}," "Play {Album Name}," "Play {Song name}," "Play {Song name} by {Artist Name}," etc. However, to make recognition more flexible, these frameworks would ordinarily not be structured as sentences, but rather based on associating slots with grammatical tags.

For example, the NER module 262 may parse the spoken utterance to identify words as subject, object, verb, preposition, etc., based on grammar rules and models, prior to recognizing named entities. The identified verb may be used by the IC module 264 to identify intent, which is then used by the NER module 262 to identify frameworks. A framework for an intent of "play" may specify a list of slots/fields applicable to play the identified "object" and any object modifier (e.g., a prepositional phrase), such as {Artist Name}, {Album Name}, {Song name}, etc. The NER module 262 then searches the corresponding fields in the domain-specific and personalized lexicon(s), attempting to match words and phrases in the utterance tagged as a grammatical object or object modifier with those identified in the database(s).

This process includes semantic tagging, which is the labeling of a word or combination of words according to their type/semantic meaning. Parsing may be performed using heuristic grammar rules, or the NER module 262 may be constructed using techniques such as HMMs, maximum entropy models, log linear models, conditional random fields (CRF), and the like.

For instance, an utterance of "play mother's little helper by the rolling stones" might be parsed and tagged as {Verb}: "Play," {Object}: "mother's little helper," {Object Preposition}: "by," and {Object Modifier}: "the rolling stones." At this point in the process, "Play" is identified as a verb based on a word database associated with the music domain, which the IC module 264 will determine corresponds to the "play music" intent. No determination has been made as to the meaning of "mother's little helper" and "the rolling stones," but based on grammar rules and models, it is determined that these phrases relate to the grammatical object of the spoken utterance.

The frameworks linked to the intent are then used to determine what database fields should be searched to determine the meaning of these phrases, such as searching a user's gazette for similarity with the framework slots. So a framework for "play music intent" might indicate to attempt to resolve the identified object based on {Artist Name}, {Album Name}, and {Song name}, and another framework for the same intent might indicate to attempt to resolve the object modifier based on {Artist Name}, and resolve the object based on {Album Name} and {Song Name} linked to the identified {Artist Name}. If the search of the gazetteer does not resolve the slot/field using gazetteer information, the NER module 262 may search the database of generic words associated with the domain (i.e., in the NLU storage 273). For instance, if the utterance was "play songs by the rolling stones," after failing to determine an album name or song name called "songs" by "the rolling stones," the NER module 262 may search the domain vocabulary for the word "songs." In the alternative, generic words may be checked before the gazetteer information, or both may be tried, potentially producing two different results.

The comparison process used by the NER module 262 may classify (i.e., score) how closely a database entry compares to a tagged utterance word or phrase, how closely the grammatical structure of the utterance corresponds to the applied grammatical framework, and based on whether the database indicates a relationship between an entry and information identified to fill other slots of the framework.

The NER module 262 may also use contextual operational rules to fill slots. For example, if a user had previously requested to pause a particular song and thereafter requested that the speech-controlled device 110a "please un-pause my music," the NER module 262 may apply an inference-based rule to fill a slot associated with the name of the song that the user currently wishes to play—namely the song that was playing at the time the user requested to pause the music.

The results of NLU processing may be tagged to attribute meaning to the utterance. So, for example, "play mother's little helper by the rolling stones" might produce a result of: {domain} Music, {intent} Play Music, {artist name} "rolling stones," {media type} SONG, and {song title} "mother's little helper." As another example, "play songs by the rolling stones" might produce: {domain} Music, {intent} Play Music, {artist name} "rolling stones," and {media type} SONG.

The output from the NLU processing, which may include tagged text data, commands, etc., may then be sent to a command processor 290, which may be located on a same or separate server 120 as part of the system 100. The system 100 may include more than one command processor 290, and the command processor 290 may be determined based on the NLU output. For example, if the NLU output includes a command to play music, the command processor 290 selected may be a music playing application, such as one located on the speech-controlled device 110a or in a music playing appliance, configured to execute a music playing command. If the NLU output includes a search utterance (e.g., requesting the return of search results), the command processor 290 selected may include a search engine processor, such as one located on a search server, configured to execute a search command and determine search results, which may include output text data to be processed by a TTS engine and output from a device as synthesized speech.

If the NLU output includes a command to obtain content, the command processor 290, through an application program interface (API), may send a request for such content to an appropriate application server(s) 125. The application server(s) 125 may require the user be authenticated prior to the application server(s) 125 providing responsive content to the command processor 290. As such, the command processor 290, through an API, may receive an indication from the application server(s) 125 to authenticate the user. The command processor 290 may indicate the need for user authentication to a user authentication engine 210 of the server 120. The user authentication engine 210 may perform user authentication as described herein.

Figure 3:
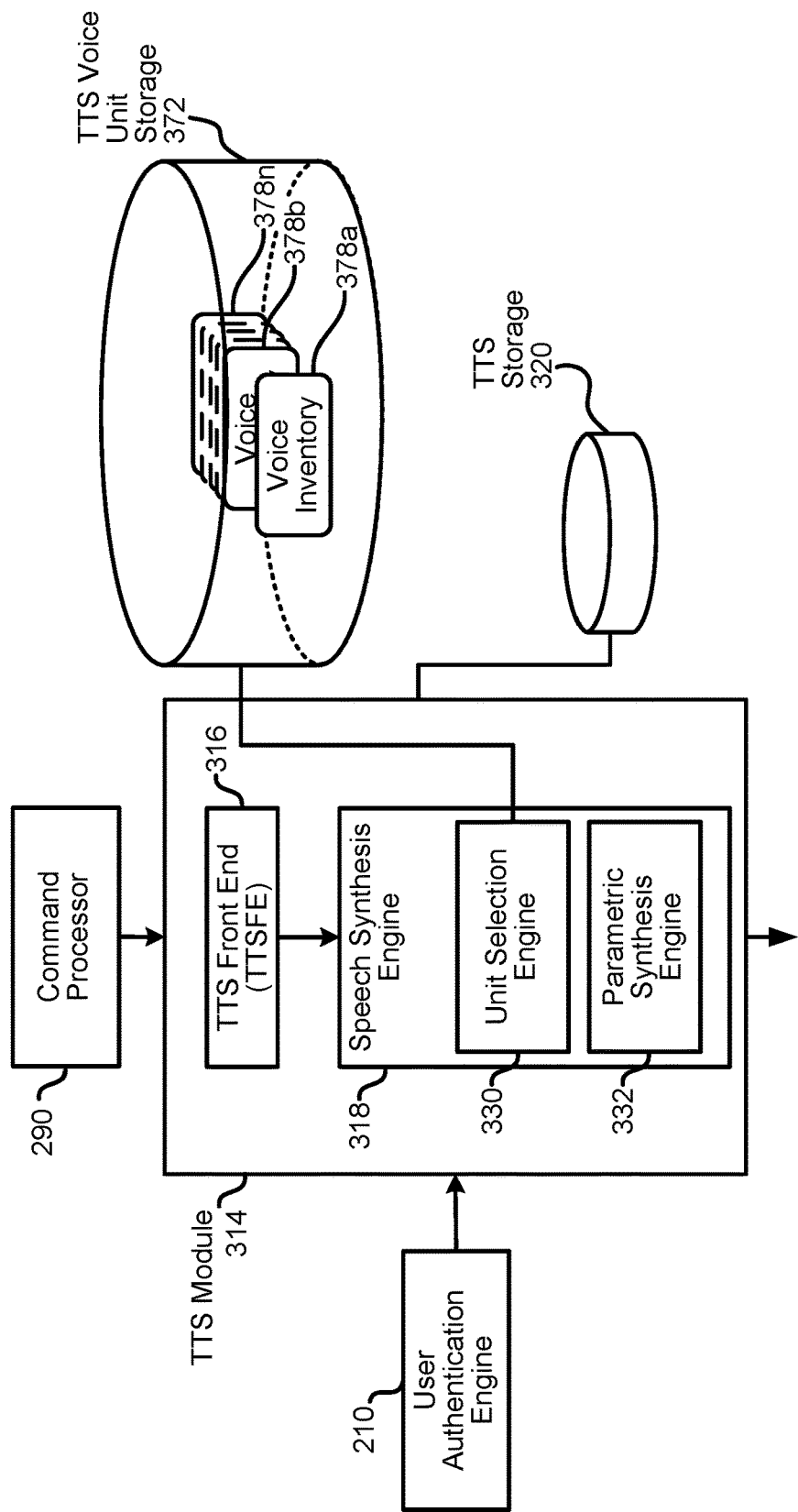
FIG. 3 is a conceptual diagram of how text-to-speech processing is performed according to embodiments of the present disclosure.

A TTS module 314 may receive tagged text data from the command processor 290, so the TTS module 314 may synthesize speech corresponding to the text data. Speech may be synthesized by the TTS module 314 as described below with respect to FIG. 3. The TTS module 314 may also receive text data from the user authentication engine 210, for example to create synthesized speech that prompts a user to provide authentication data (or further authentication data) as described herein.

The TTS module/processor/component 314 includes a TTS front end (TTSFE) 316, a speech synthesis engine 318, and a TTS storage 320. The TTSFE 316 transforms input text data (e.g., from the command processor 290 or the user authentication engine 210) into a symbolic linguistic representation for processing by the speech synthesis engine 318. The TTSFE 316 may also process tags or other data input to the TTS module 314 that indicate how specific words should be pronounced. The speech synthesis engine 318 compares the annotated phonetic units and information stored in the TTS storage 320 for converting the input text data into speech (i.e., audio data). The TTSFE 316 and the speech synthesis engine 318 may include their own controller(s)/processor(s) and memory, or they may use the controller/processor and memory of the server 120, the speech-controlled device 110a, or another device, for example. Similarly, the instructions for operating the TTSFE 316 and the speech synthesis engine 318 may be located within the TTS module 314, within the memory and/or storage of the server 120, the speech-controlled device 110a, or within an external device.

Text data input into the TTS module 314 may be sent to the TTSFE 316 for processing. The TTSFE 316 may include modules for performing text normalization, linguistic analysis, and linguistic prosody generation. During text normalization, the TTSFE 316 processes the input text data and generates standard/normalized text data, converting such things as numbers, abbreviations (e.g., Apt., St., etc.), and symbols ($, %, etc.) into the equivalent of written out words.

During linguistic analysis the TTSFE 316 analyzes language in the normalized text data to generate a sequence of phonetic units corresponding to the text data. This process may be referred to as phonetic transcription. Phonetic units include symbolic representations of sound units to be eventually combined and output by the system 100 as speech. Various sound units may be used for dividing text data for purposes of speech synthesis. The TTS module 314 may process speech based on phonemes (i.e., individual sounds), half-phonemes, di-phones (i.e., the last half of one phoneme coupled with the first half of an adjacent phoneme), bi-phones (i.e., two consecutive phonemes), syllables, words, phrases, sentences, or other units. Each word may be mapped to one or more phonetic units. Such mapping may be performed using a language dictionary stored by the system 100, for example in the TTS storage 320. The linguistic analysis performed by the TTSFE 316 may also identify different grammatical components such as prefixes, suffixes, phrases, punctuation, syntactic boundaries, or the like. Such grammatical components may be used by the TTS module 314 to craft a natural sounding audio waveform output. The language dictionary may also include letter-to-sound rules and other tools that may be used to pronounce previously unidentified words or letter combinations that may be encountered by the TTS module 314. Generally, the more information included in the language dictionary, the higher quality the speech output.

Based on the linguistic analysis, the TTSFE 316 may then perform linguistic prosody generation where the phonetic units are annotated with desired prosodic characteristics, also called acoustic features, which indicate how the desired phonetic units are to be pronounced in the eventual output speech. During this stage, the TTSFE 316 may consider and incorporate any prosodic annotations that accompanied the text data input to the TTS module 314. Such acoustic features may include pitch, energy, duration, and the like. Application of acoustic features may be based on prosodic models available to the TTS module 314. Such prosodic models indicate how specific phonetic units are to be pronounced in certain circumstances. A prosodic model may consider, for example, a phoneme's position in a syllable, a syllable's position in a word, a word's position in a sentence or phrase, neighboring phonetic units, etc. As with the language dictionary, a prosodic model with more information may result in higher quality speech output than prosodic models with less information.

The output of the TTSFE 316, referred to as a symbolic linguistic representation, may include a sequence of phonetic units annotated with prosodic characteristics. This symbolic linguistic representation may be sent to the speech synthesis engine 318, also known as a synthesizer, for conversion into an audio waveform of speech for output to an audio output device and eventually to a user. The speech synthesis engine 318 may be configured to convert the input text data into high-quality natural-sounding speech in an efficient manner. Such high-quality speech may be configured to sound as much like a human speaker as possible, or may be configured to be understandable to a listener without attempts to mimic a precise human voice.

The speech synthesis engine 318 may perform speech synthesis using one or more different methods. In one method of synthesis called unit selection, a unit selection engine 330 matches the symbolic linguistic representation created by the TTSFE 316 against a database of recorded speech, such as a database of a voice corpus. The unit selection engine 330 matches the symbolic linguistic representation against spoken audio units in the database. Matching units are selected and concatenated together to form a speech output. Each unit includes an audio waveform corresponding with a phonetic unit, such as a short .wav file of the specific sound, along with a description of the various acoustic features associated with the .wav file (e.g., its pitch, energy, etc.), as well as other information, such as where the phonetic unit appears in a word, sentence, or phrase, neighboring phonetic units, etc. Using all the information in the unit database, the unit selection engine 330 may match units to the input text data to create a natural sounding waveform. The unit database may include multiple examples of phonetic units to provide the system 100 with many different options for concatenating units into speech. One benefit of unit selection is that, depending on the size of the database, a natural sounding speech output may be generated. As described above, the larger the unit database of the voice corpus, the more likely the system 100 will be able to construct natural sounding speech.

In another method of synthesis, called parametric synthesis, parameters such as frequency, volume, and noise are varied by a parametric synthesis engine 332, a digital signal processor, or other audio generation device to create an artificial speech waveform output. Parametric synthesis uses a computerized voice generator, sometimes called a vocoder. Parametric synthesis may use an acoustic model and various statistical techniques to match a symbolic linguistic representation with desired output speech parameters. Parametric synthesis may include the ability to be accurate at high processing speeds, as well as the ability to process speech without large databases associated with unit selection, but also typically produces an output speech quality that may not match that of unit selection. Unit selection and parametric techniques may be performed individually or combined together and/or combined with other synthesis techniques to produce speech audio data output.

Parametric speech synthesis may be performed as follows. The TTS module 314 may include an acoustic model, or other models, which may convert a symbolic linguistic representation into a synthetic acoustic waveform of the input text data based on audio signal manipulation. The acoustic model includes rules which may be used by the parametric synthesis engine 332 to assign specific audio waveform parameters to input phonetic units and/or prosodic annotations. The rules may be used to calculate a score representing a likelihood that a particular audio output parameter(s) (e.g., frequency, volume, etc.) corresponds to the portion of the input symbolic linguistic representation received from the TTSFE 316.

The parametric synthesis engine 332 may use a number of techniques to match speech to be synthesized with input phonetic units and/or prosodic annotations. One common technique is using HMMs. HMMs may be used to determine probabilities that audio output should match textual input. HMMs may be used to translate from parameters from the linguistic and acoustic space to parameters to be used by a vocoder (i.e., the digital voice encoder) to artificially synthesize the desired speech. Using HMMs, a number of states are presented, in which the states together represent one or more potential acoustic parameters to be output to the vocoder and each state is associated with a model, such as a Gaussian mixture model. Transitions between states may also have an associated probability, representing a likelihood that a current state may be reached from a previous state. Sounds to be output may be represented as paths between states of the HMM and multiple paths may represent multiple possible audio matches for the same input text data. Each portion of text data may be represented by multiple potential states corresponding to different known pronunciations of phonemes and their parts (e.g., phoneme identity, stress, accent, position, etc.). An initial determination of a probability of a potential phoneme may be associated with one state. As new text data is processed by the speech synthesis engine 318, the state may change or stay the same, based on processing of the new text data. For example, the pronunciation of a previously processed word might change based on later processed words. A Viterbi algorithm may be used to find the most likely sequence of states based on the processed text data. The HMMs may generate speech in parametrized form including parameters such as fundamental frequency (f0), noise envelope, spectral envelope, etc. that are translated by a vocoder into audio segments. The output parameters may be configured for particular vocoders such as a STRAIGHT vocoder, TANDEM-STRAIGHT vocoder, harmonic plus noise (HNM) based vocoders, code-excited linear prediction (CELP) vocoders, GlottHMM vocoders, harmonic/stochastic model (HSM) vocoders, or others.

For example, to create the customized speech output of the system 100, the system 100 may be configured with multiple voice inventories 378 (stored in TTS voice unit storage 372), where each unit database is configured with a different "voice." Such voice inventories may also be linked to user accounts, discussed below. For example, one voice corpus may be stored to be used to synthesize whispered speech (or speech approximating whispered speech), another may be stored to be used to synthesize excited speech (or speech approximating excited speech), and so on. To create the different voice corpuses a multitude of TTS training utterances may be spoken by an individual and recorded by the system 100. The TTS training utterances used to train a TTS voice corpus may be different from the training utterances used to train an ASR system. The audio associated with the TTS training utterances may then be split into small audio segments and stored as part of a voice corpus. The individual speaking the TTS training utterances may speak in different voice qualities to create the customized voice corpuses, for example the individual may whisper the training utterances, say them in an excited voice, and so on. Thus, the audio of each customized voice corpus may match a desired speech quality. The customized voice inventory 378 may then be used during runtime to perform unit selection to synthesize speech.

As an alternative to customized voice corpuses or customized parametric "voices," one or more filters may be used to alter traditional TTS output to match a desired speech quality (e.g., whisper, shout, etc.). For example, the TTS module 314 may synthesize speech as normal, but the system 100, either as part of the TTS module 314 or otherwise, may apply a filter to make the synthesized speech take on the desired speech quality. In this manner a traditional TTS output may be altered to take on the desired speech quality.

During runtime the TTS module 314 may receive text data for speech synthesis along with an indicator for a desired speech quality of the output speech. The TTS module 314 may then select a voice matching the speech quality, either for unit selection or parametric synthesis, and synthesize speech using the received text data and speech quality indicator.

Figure 4:
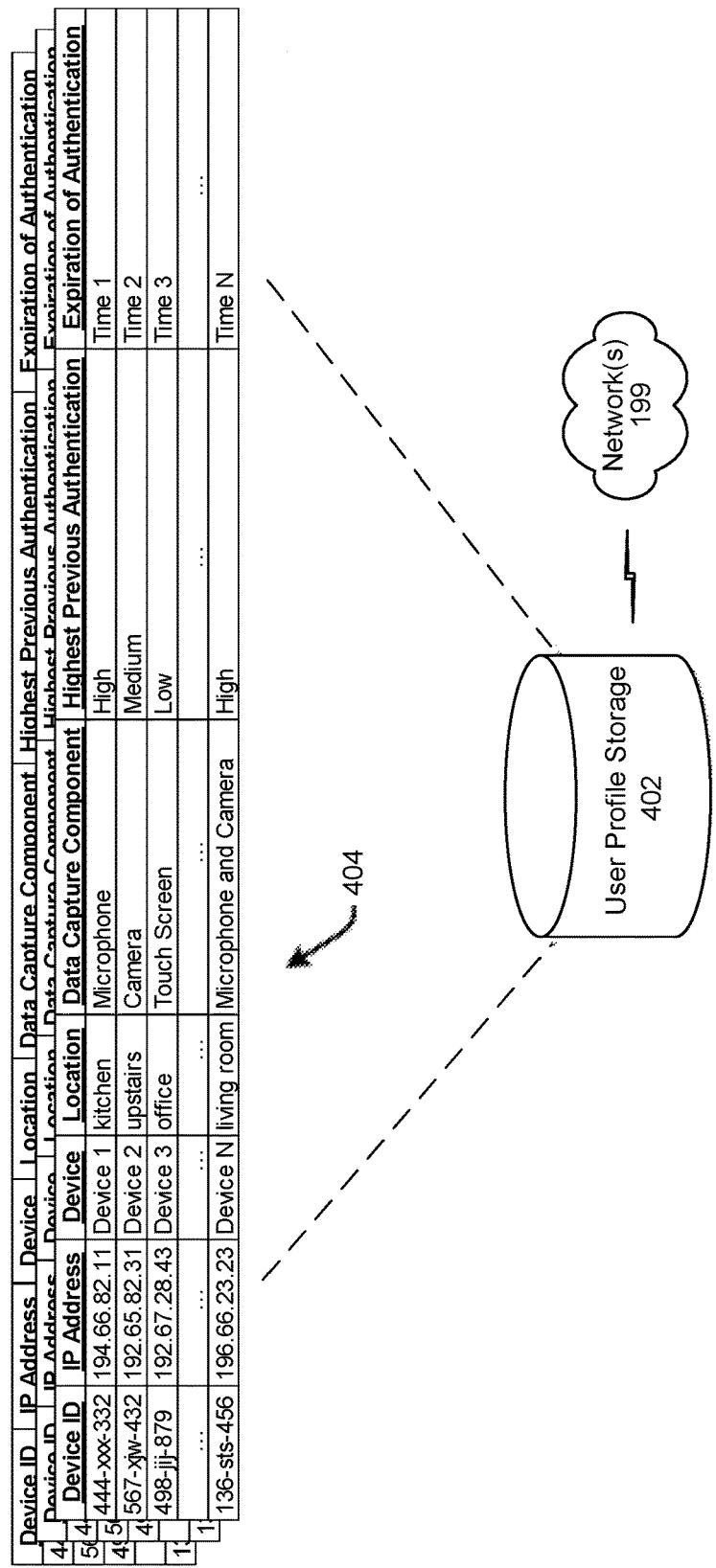
FIG. 4 illustrates data stored and associated with user profiles according to embodiments of the present disclosure.
Figure 8D:
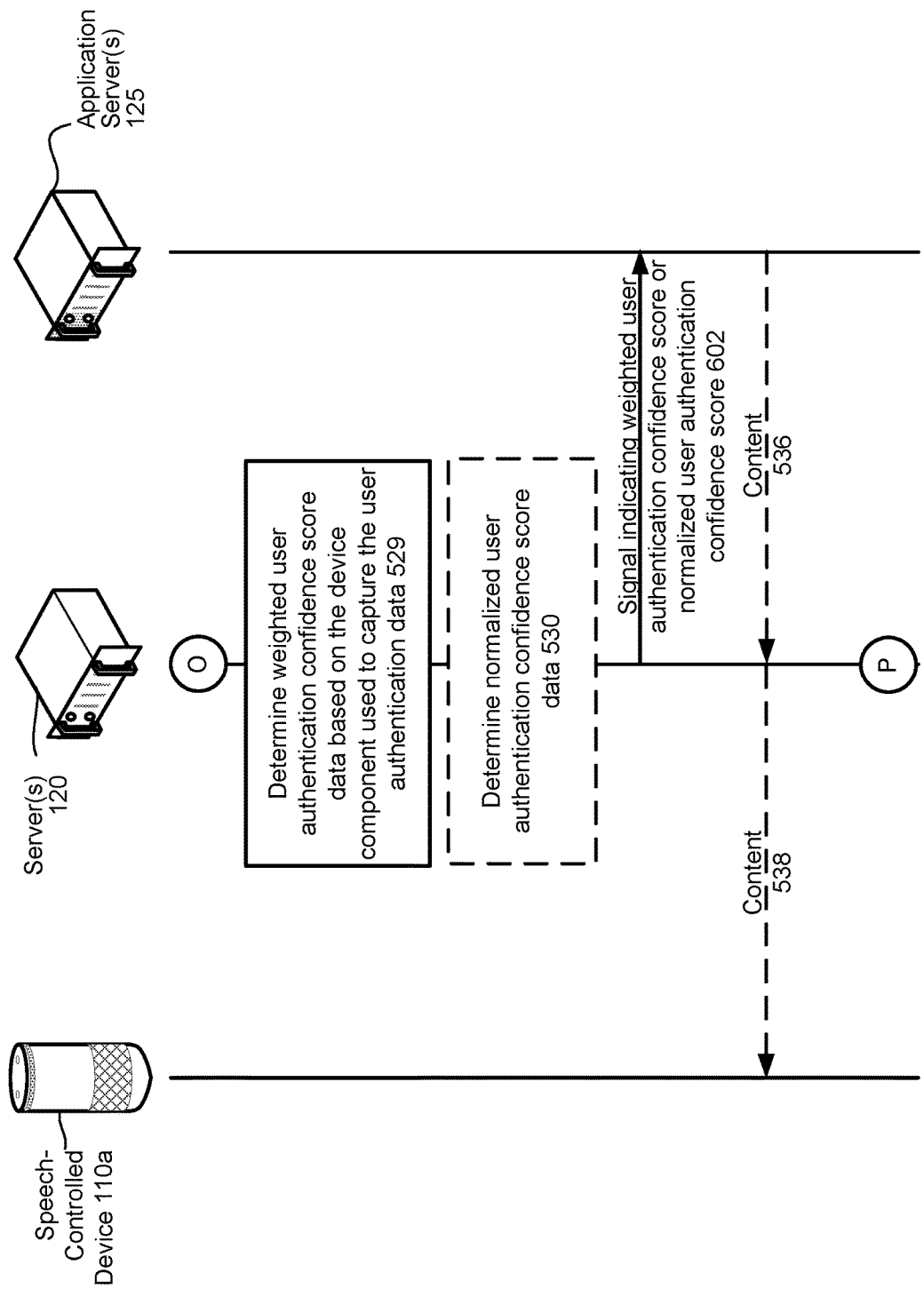

FIG. 4 illustrates a user profile storage 402 that includes data regarding user accounts 404. The user profile storage 402 may be located proximate to the server 120, or may otherwise be in communication with various components, for example over the network 199. The user profile storage 402 may include a variety of information related to individual users, accounts, etc. that interact with the system 100. For illustration, as shown in FIG. 4, the user profile storage 402 may include data regarding the devices associated with particular individual user accounts 404. In an example, the user profile storage 402 is a cloud-based storage. Each user profile 404 may include data such as device identifier (ID) data, internet protocol (IP) address data, device name data, device location data, and device capture component data. The user profile may include information regarding what device and/or user authentication techniques may be appropriate for the particular user. For example, the user account may indicate a particular phone, password(s), wearable (e.g., smart watch), a retina scanner nearby the user, a camera, a fingerprint scanner nearby the user (e.g., on the user phone), etc. In addition, while not illustrated, each user profile 404 may include weight factor data representing a reliability of the respective device/data capture component with respect to user authentication, time since last authentication, audio data corresponding to example spoken utterances of a respective user, images including retina information of respective users. Moreover, the user profile storage 404 may highest previously determined authentication data associated with a device/sensor, as well as a time when the authentication data expires (i.e., when the authentication data can no longer accurately be used to authenticate a user).

FIGS. 5A through 5E illustrate dynamic user authentication wherein an application server(s) 125 provides a threshold user authentication confidence score upon receiving a request for content, the dynamic user authentication involves a feedback loop, and the server 120 provides a signal to the application server(s) 125 indicating the threshold user authentication confidence score is satisfied. The speech-controlled device 110a captures (502) input audio corresponding to a spoken utterance and determines input audio data from the spoken utterance. The speech-controlled device 110a may determine (504) the input audio data includes wakeword data using keyword/wakeword detection processes as described herein above. The speech-controlled device 110a sends (506) the input audio data (corresponding to a spoken command and potentially the wakeword as well) to the server 120 associated with the speech-controlled device 110a.

The server 120 performs speech processing on the spoken command audio data of the input audio data. For example, the server 120 may perform (508) ASR on the spoken command audio data to create spoken command text data. The server 120 may perform (510) NLU on the spoken command text data and may determine (512 illustrated in FIG. 5B), therefrom, the spoken command text data includes a command to receive content. The server 120 may determine (514) a source of the content (e.g., may determine the content is stored by a third party application server(s) 125). The server 120 may send (516) a signal identifying and requesting the content to the application server(s) 125. In response, the server 120 may receive (518) a signal requesting data indicating a user authentication confidence score above a threshold value.

The server 120 may determine (519) one or more user authentication techniques based on a contextual situation of the user 5 described herein above. For example, the server 120 may access a user profile associated with the speech-controlled device 110a from which the spoken command audio data was received. The server 120 may determine one or more user devices indicated in the user profile. The server 120 may then cause the determined device(s) to provide the server 120 with various types of data (e.g., audio data, image data, etc.). Using the received data, the server 120 may determine which authentication technique(s) to use. For example, the server 120 may use data indicating a proximity of an individual to the device(s), data indicating whether multiple individuals are located proximate to the device(s), data indicating a noise level of captured audio, or the like, to determine one or more user authentication techniques as described herein above.

The server 120 may determine (520 illustrated in FIG. 5C), based on the determined authentication technique(s) and the threshold user authentication confidence score supplied by the application server(s) 125, one or more user devices from which to receive user authentication data. The one or more user devices may be determined from a user profile, associated with the user, that indicates the one or more user devices. Each user authentication technique may be associated with a particular type of data (e.g., speech authentication may be associated with audio data, facial recognition may be associated with image data or video data, etc.). Knowing this, the server 120 may determine devices (represented in the user profile indicating the speech-controlled device 110a) having components (e.g., microphones, cameras, etc.) capable of capturing data used to perform a respective user authentication technique. Moreover, each device, device's audio capture component, and/or user authentication technique may be associated with a maximum weighted confidence score. The server 120 may determine which and how many user devices to use to capture data to authenticate the user based on the respective maximum weighted confidence score.

The server 120 may send (522) a signal to each determined device, with the signal requesting the respective device to provide data usable for user authentication. The signal may include TTS created speech that solicits the user provide user authentication data, such as speech, for example. The signal may also or alternatively include text data to be displayed to the user, with the text data including content that solicits the user provide user authentication data. As illustrated, the determined device is the speech-controlled device 110a. However, it should be appreciated that other user devices (e.g., touch interface devices, biometric devices, etc.) may be sent signals depending upon the situation and the user authentication data needed by the server 120. The user device (e.g., the speech-controlled device 110a) captures (524) data usable by the server 120 to perform user authentication, and sends (526) the user authentication data to the server 120.

The server 120 may determine (528) user authentication confidence score data (indicating a user authentication confidence score) based on the user authentication technique used (e.g., speech analysis, facial recognition, passcode, biometric analysis). Each device component may have a respective user authentication reliability weight. As such, the server 120 may determine (529 illustrated in FIG. 5D) weighted user authentication confidence score data (indicating a weighted user authentication confidence score) based on the determined user authentication confidence score data and based on the device component's reliability weight. If the server 120 determines weighted user authentication confidence score data based on multiple user authentication confidence score data and respective device component reliability weights, the server 120 may determine (530) normalized user authentication confidence score data (indicating a normalized user authentication confidence score.

Various techniques may be used to determine (529) the weighted user authentication confidence scores or to determine (530) the normalized user authentication confidence scores. In certain embodiments various rules and/or trained models may be configured to process incoming user authentication data to determine a weighted score/normalized score. Such rule(s)/model(s) may be based on training data indicating how various user authentication data may be received from various sources and how confidence levels of that authentication data may be determined and then weighted.

Various machine learning techniques may be used to perform the training of components that determine a user authentication confidence or otherwise process user authentication data, such as the user authentication engine 210, or other components. Models may be trained and operated according to various machine learning techniques. Such techniques may include, for example, inference engines, trained classifiers, etc. Examples of trained classifiers include conditional random fields (CRF) classifiers, Support Vector Machines (SVMs), neural networks (such as deep neural networks and/or recurrent neural networks), decision trees, AdaBoost (short for "Adaptive Boosting") combined with decision trees, and random forests. Focusing on CRF as an example, CRF is a class of statistical models used for structured predictions. In particular, CRFs are a type of discriminative undirected probabilistic graphical models. A CRF can predict a class label for a sample while taking into account contextual information for the sample. CRFs may be used to encode known relationships between observations and construct consistent interpretations. A CRF model may thus be used to label or parse certain sequential data, like query text as described above. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the first or second models, requires establishing a "ground truth" for the training examples. In machine learning, the term "ground truth" refers to the accuracy of a training set's classification for supervised learning techniques. For example, known types for previous queries may be used as ground truth data for the training set used to train the various components/models. Various techniques may be used to train the models including backpropagation, statistical learning, supervised learning, semi-supervised learning, stochastic learning, stochastic gradient descent, or other known techniques. Thus, many different training examples may be used to train the classifier(s)/model(s) discussed herein. Further, as training data is added to, or otherwise changed, new classifiers/models may be trained to update the classifiers/models as desired.

The user authentication system may be configured with a feedback loop that enables the server 120 to gather additional user authentication data if needed. For example, the server 120 may determine (532 illustrated in FIG. 5E) whether the weighted user authentication confidence score (or the normalized user authentication confidence score depending upon the situation) meets or exceeds the threshold user authentication confidence score provided by the application server(s) 125. The user authentication engine 210 of the server 120 may perform one or more of determining (528) the user authentication confidence score data, determining (529) the weighted user authentication confidence score data, determining (530) the normalized user authentication confidence score data, determining (532) whether the user authentication confidence score satisfies the threshold user authentication confidence score, and other authentication processes described herein. If the weighted user authentication confidence score (or the normalized user authentication confidence score) is below the threshold user authentication confidence score, the server 120 re-performs user authentication starting with step 519. If the server 120 performs N amount of user authentications that all result in the weighted user authentication confidence score (or the normalized user authentication confidence score) being below the threshold user authentication confidence score, the server 120 may cease user authentication, and notify the application server(s) 125 and the speech-controlled device 110a that the user could not be authenticated. It should be appreciated that, after the server 120 performs N dynamic user authentications, and all of the authentications result in the threshold user authentication confidence score being unsatisfied, the server 120 may cease user authentication, and may sends signals indicating such to the application server(s) 125 and/or the speech-controlled device 110a. If, instead, the weighted user authentication confidence score (or the normalized user authentication confidence score) meets or exceeds the threshold user authentication confidence score, the server 120 may send (534) a signal to the application server(s) 125 indicating the threshold user authentication confidence score is satisfied. The application server(s) 125 thereafter sends (536) the requested content to the server 120, the server 120 forwards (538) the content to the speech-controlled device 538, and the speech-controlled device 110*a* outputs (540) the content. Forwarding of the content by the server 120 to the speech-controlled device 110*a* may include the server 120 creating TTS speech representing content text data received by the server 120 from the application server(s) 125. It should also be appreciated that the speech-controlled device 110*a* may receive the content from a device (e.g., the application server(s) 125) other than the server. For example, the speech-controlled device 110*a* may be in communication with the application server(s) 125 without the server 120 necessarily acting as an intermediary.

The spoken command may be a request for data (e.g., music, a video, etc.) to be streamed. In this situation, instead of sending content, the application server(s) 125 may send a link to a content stream to the server 120, the server 120 forwards the link to the speech-controlled device 110*a* (or other device), and the speech-controlled device 110*a* accesses the requested content via the link.

FIGS. 6A through 6E illustrate dynamic user authentication wherein an application server(s) 125 provides a threshold user authentication confidence score upon receiving a request for content, the dynamic user authentication does not involve a feedback loop, and the server 120 provides a signal to the application server(s) 125 specifically indicating a determined weighted user authentication confidence score or normalized user authentication confidence score. The speech-controlled device 110*a* captures (502) input audio corresponding to a spoken utterance and determines input audio data from the spoken utterance. The speech-controlled device 110*a* may determine (504) the input audio data includes wakeword data using keyword/wakeword detection processes as described herein above. The speech-controlled device 110*a* sends (506) the input audio data (corresponding to a spoken command and potentially the wakeword as well) to the server 120 associated with the speech-controlled device 110*a*.

The server 120 performs speech processing on the spoken command audio data of the input audio data. For example, the server 120 may perform (508) ASR on the spoken command audio data to create spoken command text data. The server 120 may perform (510) NLU on the spoken command text data and may determine (512 illustrated in FIG. 6B), therefrom, the spoken command text data includes a command to receive content. The server 120 may determine (514) a source of the content, and may determine (519) one or more user authentication techniques based on a contextual situation of the user 5 as described herein above. The server 120 may also determine (520 illustrated in FIG. 6C), based on the determined authentication technique(s) and the threshold user authentication confidence score supplied by the application server(s) 125, one or more user devices from which to receive user authentication data, as described herein above. The server 120 may send (522) a signal to each determined device, with the signal requesting the respective device to provide data usable for user authentication. The user device (e.g., the speech-controlled device 110*a*) captures (524) data usable by the server 120 to perform user authentication, and sends (526) the user authentication data to the server 120.

The server 120 may determine (528) user authentication confidence score data (indicating a user authentication confidence score) based on the user authentication technique used (e.g., speech analysis, facial recognition, passcode, biometric analysis). Since each device component may have a respective user authentication reliability weight, the server 120 may also determine (529 illustrated in FIG. 6D) weighted user authentication confidence score data (indicating a weighted user authentication confidence score) based on the determined user authentication confidence score data and based on the device component's reliability weight. If the server 120 determines weighted user authentication confidence score data based on multiple user authentication confidence score data and respective device component reliability weights, the server 120 may determine (530) normalized user authentication confidence score data (indicating a normalized user authentication confidence score. The user authentication engine 210 of the server 120 may perform one or more of determining (528) the user authentication confidence score data, determining (529) the weighted user authentication confidence score data, determining (530) the normalized user authentication confidence score data, and other authentication processes described herein.

The server 120 then sends (602), to the application server(s) 125, a signal indicating either the weighted user authentication confidence score or the normalized user authentication confidence score. The application server(s) 125 may determine (603) whether the received user authentication confidence score satisfies a data dissemination threshold requirement of the application server(s) 125. If the application server(s) 125 determines the weighted user authentication confidence score or the normalized user authentication confidence score satisfies is sufficient, the server 120 receives (536) the requested content from the application server(s) 125. The server 120 then sends (538 illustrated in FIG. 6E) the content (or TTS speech representing content text data received by the server 120 from the application server(s) 125) to the speech-controlled device 110*a*, and the speech-controlled device 110 outputs (540) the content (or TTS speech). Alternatively, if the application server(s) 125 determines the weighted user authentication confidence score or the normalized user authentication confidence score fails to satisfy data dissemination requirements of the application server(s) 125, the server 120 receives (604) a signal from the application server(s) 125 indicating the content will not be provided because the user was not authenticated. In response, the server 120 may send (606) a signal including TTS speech indicating the user was not authenticated and the requested content will not be provided.

FIGS. 7A through 7E illustrate dynamic user authentication wherein an application server(s) 125 does not provide a threshold user authentication confidence score upon receiving a request for content, rather the server 120 determines the threshold user authentication confidence score from a library. The speech-controlled device 110*a* captures (502) input audio corresponding to a spoken utterance and determines input audio data from the spoken utterance. The speech-controlled device 110*a* may determine (504) the input audio data includes wakeword data using keyword/wakeword detection processes as described herein above. The speech-controlled device 110*a* sends (506) the input audio data (corresponding to a spoken command and potentially the wakeword as well) to the server 120 associated with the speech-controlled device 110*a*.

The server 120 performs speech processing on the spoken command audio data of the input audio data. For example, the server 120 may perform (508) ASR on the spoken command audio data to create spoken command text data. The server 120 may perform (510) NLU on the spoken command text data and may determine (512 illustrated in FIG. 7B), therefrom, the spoken command text data includes a command to receive content. The server 120 may determine (514) a source of the content, and may send (516) a signal identifying and requesting the content to the content source (e.g., the application server(s) 125). In response, the server 120 may receive (702) a signal indicating the user needs to be authenticated prior to the application server(s) 125 providing the server 120 with the requested content.

The server 120 may access (704) a storage including content source data (e.g., data identifying application servers 125) associated with respective threshold user authentication confidence score data. The server 120 may determine (706 illustrated in FIG. 7C) threshold user authentication confidence score data associated with the application server(s) 125 within the data storage. The server 120 may determine (519) one or more user authentication techniques based on a contextual situation of the user 5 as described herein above. The server 120 may also determine (520), based on the determined authentication technique(s) and the threshold user authentication confidence score data identified in the storage, one or more user devices from which to receive user authentication data, as described herein above. The server 120 may send (522) a signal to each determined device, with the signal requesting the respective device to provide data usable for user authentication. The user device (e.g., the speech-controlled device 110a) captures (524) data usable by the server 120 to perform user authentication, and sends (526) the user authentication data to the server 120.

The server 120 may determine (528 illustrated in FIG. 7D) user authentication confidence score data (indicating a user authentication confidence score) based on the user authentication technique used (e.g., speech analysis, facial recognition, passcode, biometric analysis). Since each device component may have a respective user authentication reliability weight, the server 120 may also determine (529) weighted user authentication confidence score data (indicating a weighted user authentication confidence score) based on the determined user authentication confidence score data and based on the device component's reliability weight. If the server 120 determines weighted user authentication confidence score data based on multiple user authentication confidence score data and respective device component reliability weights, the server 120 may determine (530) normalized user authentication confidence score data (indicating a normalized user authentication confidence score. The user authentication engine 210 of the server 120 may perform one or more of determining (528) the user authentication confidence score data, determining (529) the weighted user authentication confidence score data, determining (530) the normalized user authentication confidence score data, and other authentication processes described herein.

The server 120 then sends (602 illustrated in FIG. 7E), to the application server(s) 125, a signal indicating either the weighted user authentication confidence score or the normalized user authentication confidence score. If the application server(s) 125 determines the weighted user authentication confidence score or the normalized user authentication confidence score satisfies (e.g., meets or exceeds) the threshold user authentication confidence score, the server 120 receives (536) the requested content from the application server(s) 125. The server 120 then sends (538) the content (or TTS speech representing content text data received by the server 120 from the application server(s) 125) to the speech-controlled device 110a, and the speech-controlled device 110 outputs (540) the content (or TTS speech). Alternatively, if the application server(s) 125 determines the weighted user authentication confidence score or the normalized user authentication confidence score fails to satisfy (e.g., is below) the threshold user authentication confidence score, the server 120 receives (604) a signal from the application server(s) 125 indicating the content will not be provided because the user was not authenticated. In response, the server 120 may send (606) a signal including TTS speech indicating the user was not authenticated and the requested content will not be provided.

FIGS. 8A through 8E illustrate dynamic user authentication wherein a server 120 determines an application server(s) 125 and thereafter determines a threshold user authentication confidence score from a library, without the server 120 previously requesting content from the application server(s) 125. The speech-controlled device 110a captures (502) input audio corresponding to a spoken utterance and determines input audio data from the spoken utterance. The speech-controlled device 110a may determine (504) the input audio data includes wakeword data using keyword/wakeword detection processes as described herein above. The speech-controlled device 110a sends (506) the input audio data (corresponding to a spoken command and potentially the wakeword as well) to the server 120 associated with the speech-controlled device 110a.

The server 120 performs speech processing on the spoken command audio data of the input audio data. For example, the server 120 may perform (508) ASR on the spoken command audio data to create spoken command text data. The server 120 may perform (510) NLU on the spoken command text data and may determine (512 illustrated in FIG. 8B), therefrom, the spoken command text data includes a command to receive content. The server 120 may determine (514) a source of the content (i.e., an application server(s) 125).

Without sending a request for content to the application server(s) 125, the server 120 may access (704) a storage including content source data (e.g., data identifying application servers 125) associated with respective threshold user authentication confidence score data. The server 120 may determine (706) threshold user authentication confidence score data associated with the application server(s) 125 within the data storage. The server 120 may determine (519 illustrated in FIG. 8C) one or more user authentication techniques based on a contextual situation of the user 5 as described herein above. The server 120 may also determine (520), based on the determined authentication technique(s) and the threshold user authentication confidence score data identified in the storage, one or more user devices from which to receive user authentication data, as described herein above. The server 120 may send (522) a signal to each determined device, with the signal requesting the respective device to provide data usable for user authentication. The user device (e.g., the speech-controlled device 110a) captures (524) data usable by the server 120 to perform user authentication, and sends (526) the user authentication data to the server 120.

The server 120 may determine (528) user authentication confidence score data (indicating a user authentication confidence score) based on the user authentication technique used (e.g., speech analysis, facial recognition, passcode, biometric analysis). Since each device component may have a respective user authentication reliability weight, the server 120 may also determine (529 illustrated in FIG. 8D) weighted user authentication confidence score data (indicating a weighted user authentication confidence score) based on the determined user authentication confidence score data and based on the device component's reliability weight. If the server 120 determines weighted user authentication confidence score data based on multiple user authentication confidence score data and respective device component reliability weights, the server 120 may determine (530) normalized user authentication confidence score data (indicating a normalized user authentication confidence score. The user authentication engine 210 of the server 120 may perform one or more of determining (528) the user authentication confidence score data, determining (529) the weighted user authentication confidence score data, determining (530) the normalized user authentication confidence score data, and other authentication processes described herein.

The server 120 then sends (602), to the application server(s) 125, a signal indicating either the weighted user authentication confidence score or the normalized user authentication confidence score. If the application server(s) 125 determines the weighted user authentication confidence score or the normalized user authentication confidence score satisfies (e.g., meets or exceeds) the threshold user authentication confidence score, the server 120 receives (536) the requested content from the application server(s) 125. The server 120 then sends (538) the content (or TTS speech representing content text data received by the server 120 from the application server(s) 125) to the speech-controlled device 110a, and the speech-controlled device 110 outputs (540 illustrated in FIG. 8E) the content (or TTS speech). Alternatively, if the application server(s) 125 determines the weighted user authentication confidence score or the normalized user authentication confidence score fails to satisfy (e.g., is below) the threshold user authentication confidence score, the server 120 receives (604) a signal from the application server(s) 125 indicating the content will not be provided because the user was not authenticated. In response, the server 120 may send (606) a signal including TTS speech indicating the user was not authenticated and the requested content will not be provided.

Figure 9:
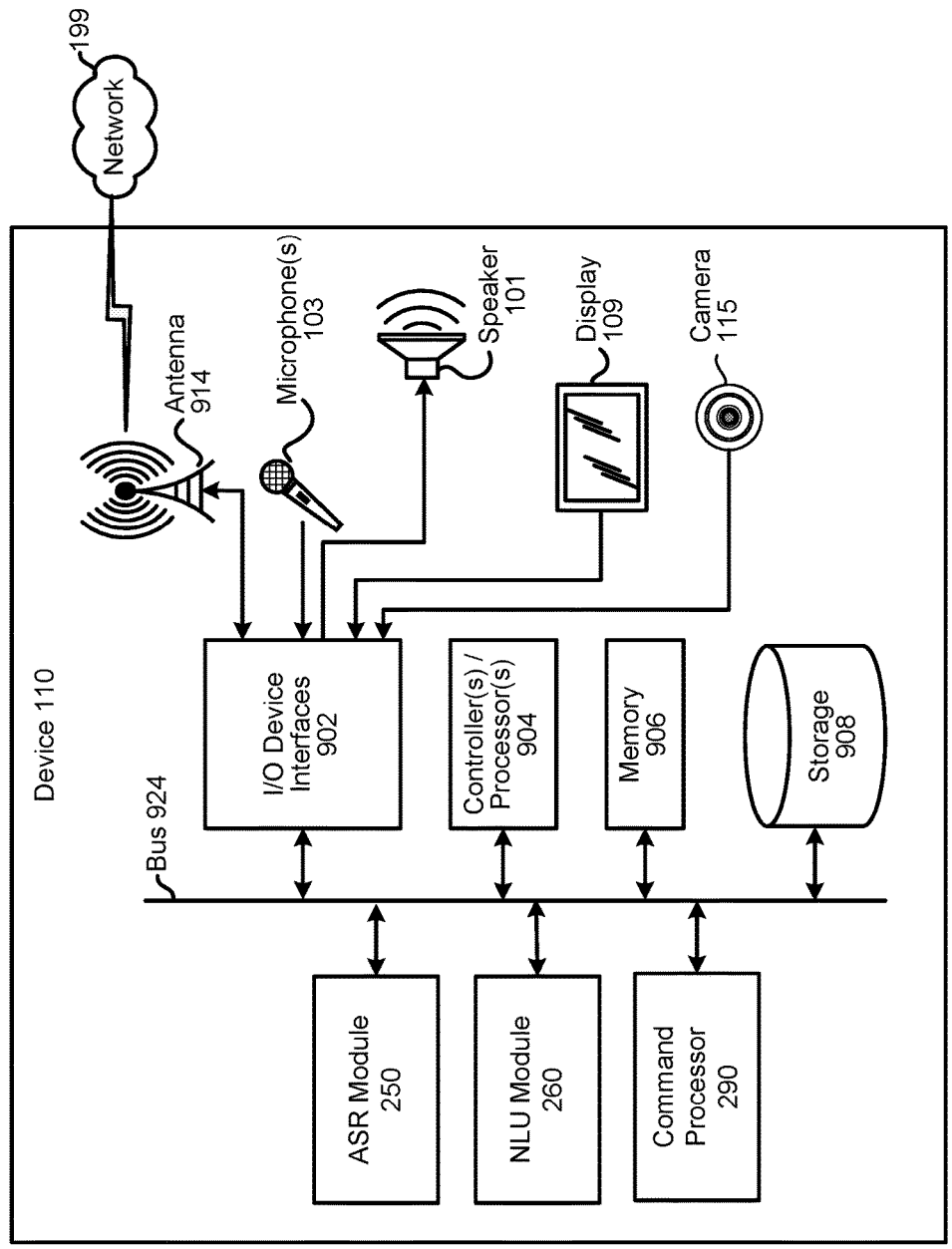
FIG. 9 is a block diagram conceptually illustrating example components of a device according to embodiments of the present disclosure.
Figure 10:
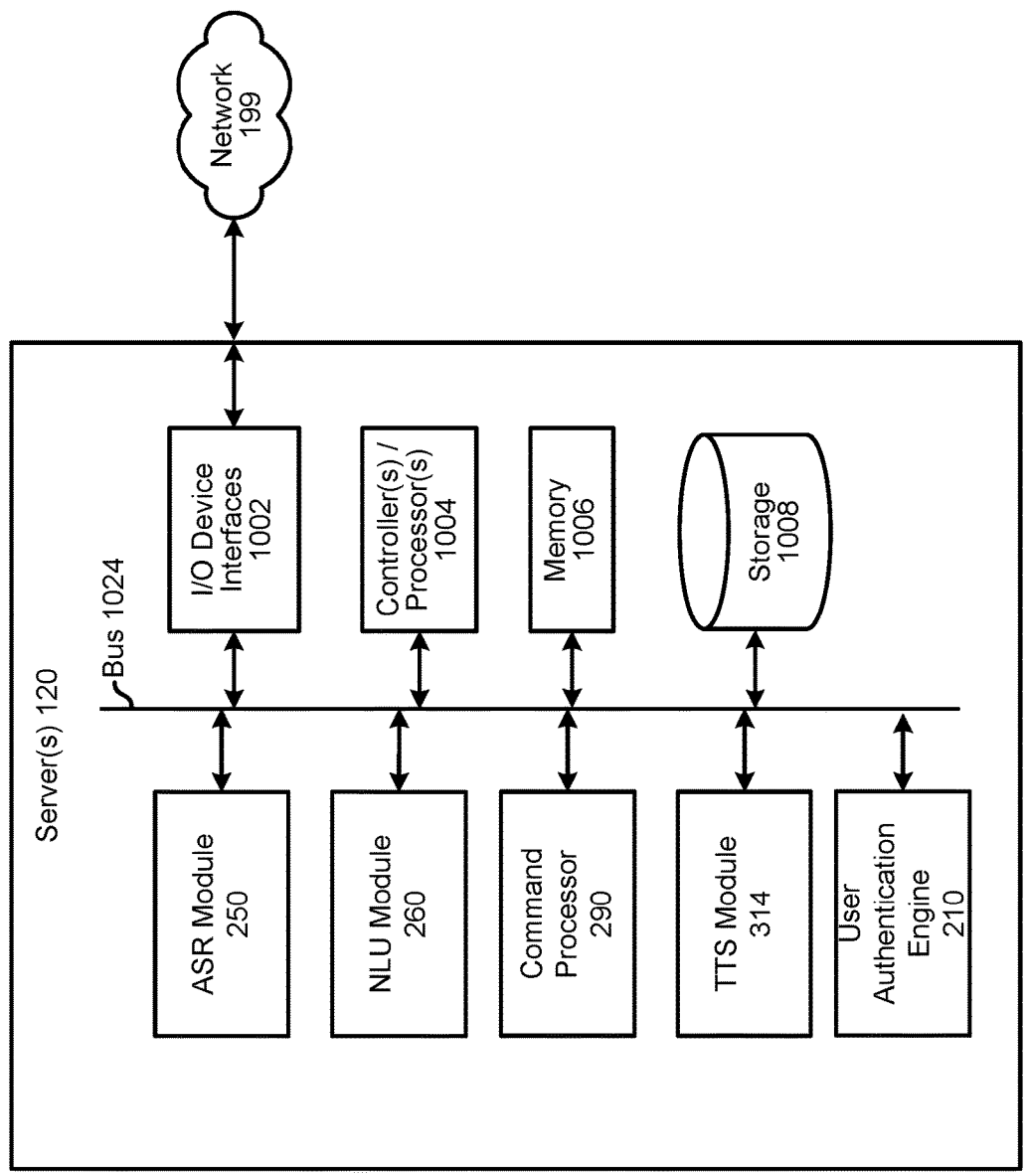
FIG. 10 is a block diagram conceptually illustrating example components of a server according to embodiments of the present disclosure.

FIG. 9 is a block diagram conceptually illustrating a user device 110 (e.g., the speech-controlled device 110a described herein) that may be used with the described system. FIG. 10 is a block diagram conceptually illustrating example components of a remote device, such as the server 120 that may assist with ASR processing, NLU processing, or command processing. Multiple servers 120 may be included in the system 100, such as one server 120 for performing ASR, one server 120 for performing NLU, etc. In operation, each of these devices (or groups of devices) may include computer-readable and computer-executable instructions that reside on the respective device (110/120), as will be discussed further below.

Each of these devices (110/120) may include one or more controllers/processors (904/1004), that may each include a central processing unit (CPU) for processing data and computer-readable instructions, and a memory (906/1006) for storing data and instructions of the respective device. The memories (906/1006) may individually include volatile random access memory (RAM), non-volatile read only memory (ROM), non-volatile magnetoresistive (MRAM) and/or other types of memory. Each device (110/120) may also include a data storage component (908/1008), for storing data and controller/processor-executable instructions. Each data storage component may individually include one or more non-volatile storage types such as magnetic storage, optical storage, solid-state storage, etc. Each device (110/120) may also be connected to removable or external non-volatile memory and/or storage (such as a removable memory card, memory key drive, networked storage, etc.) through respective input/output device interfaces (902/1002).

Computer instructions for operating each device (110/120) and its various components may be executed by the respective device's controller(s)/processor(s) (904/1004), using the memory (906/1006) as temporary "working" storage at runtime. A device's computer instructions may be stored in a non-transitory manner in non-volatile memory (906/1006), storage (908/1008), or an external device(s). Alternatively, some or all of the executable instructions may be embedded in hardware or firmware on the respective device in addition to or instead of software.

Each device (110/120) includes input/output device interfaces (902/1002). A variety of components may be connected through the input/output device interfaces (902/1002), as will be discussed further below. Additionally, each device (110/120) may include an address/data bus (924/1024) for conveying data among components of the respective device. Each component within a device (110/120) may also be directly connected to other components in addition to (or instead of) being connected to other components across the bus (924/1024).

Referring to FIG. 9, the device 110 may include input/output device interfaces 902 that connect to a variety of components such as an audio output component such as a speaker 101, a visual output component such as a display 109, a wired headset or a wireless headset (not illustrated), or other component capable of outputting audio. The display 109 may output image and/or video data as described herein (e.g., for indicating to a user that authentication data is needed). The device 110 may also include an audio capture component. The audio capture component may be, for example, a microphone 103 or array of microphones, a wired headset or a wireless headset (not illustrated), etc. The microphone 103 may be configured to capture audio. If an array of microphones is included, approximate distance to a sound's point of origin may be determined by acoustic localization based on time and amplitude differences between sounds captured by different microphones of the array. The device 110 may additionally include an image or video capture component, such as the camera 115. The camera 115 may be configured to capture data used to perform facial recognition.

For example, via antenna(s) 914, the input/output device interfaces 902 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc. A wired connection such as Ethernet may also be supported. Through the network(s) 199, the speech processing system may be distributed across a networked environment.

Referring to FIG. 10, the server 120 may include a user authentication engine 210 configured to dynamically authenticate the user as described herein. For example, the user authentication engine may perform determining (519) the user authentication technique, determining (520) user devices from which to receive user authentication data, determining (528) user authentication confidence score data, determining (529) weighted user authentication confidence score data, determining (530) normalized user authentication confidence score data, determining (532) whether the threshold user authentication confidence score is met, determining (706) the threshold user authentication confidence score data, or other tasks described above.

The device 110 and/or the server 120 may include an ASR module 250. The ASR module 250 in the device 110 may be of limited or extended capabilities. The ASR module 250 may include the language models 254 stored in ASR model storage component 252. If limited speech recognition is included, the ASR module 250 may be configured to identify a limited number of words, whereas extended speech recognition may be configured to recognize a much larger range of words.

The device 110 and/or the server 120 may include a limited or extended NLU module 260. The NLU module 260 in the device 110 may be of limited or extended capabilities. The NLU module 260 may comprise the name entity recognition module 262, the intent classification module 264, and/or other components. The NLU module 260 may also include a stored knowledge base and/or entity library, or those storages may be separately located.

The device 110 and/or the server 120 may also include the command processor 290 configured to execute commands/functions associated with a spoken utterance as described herein.

To create synthesized output speech (e.g., to indicate to a user that authentication data is needed), the server 120 may be configured with the TTS module 314 described in detail herein above.

As noted above, multiple devices may be employed in a single speech processing system. In such a multi-device system, each of the devices may include different components for performing different aspects of the speech processing. The multiple devices may include overlapping components. The components of the device 110 and the server 120, as illustrated in FIGS. 9 and 10, are exemplary, and may be located as a stand-alone device or may be included, in whole or in part, as a component of a larger device or system.

Figure 11:
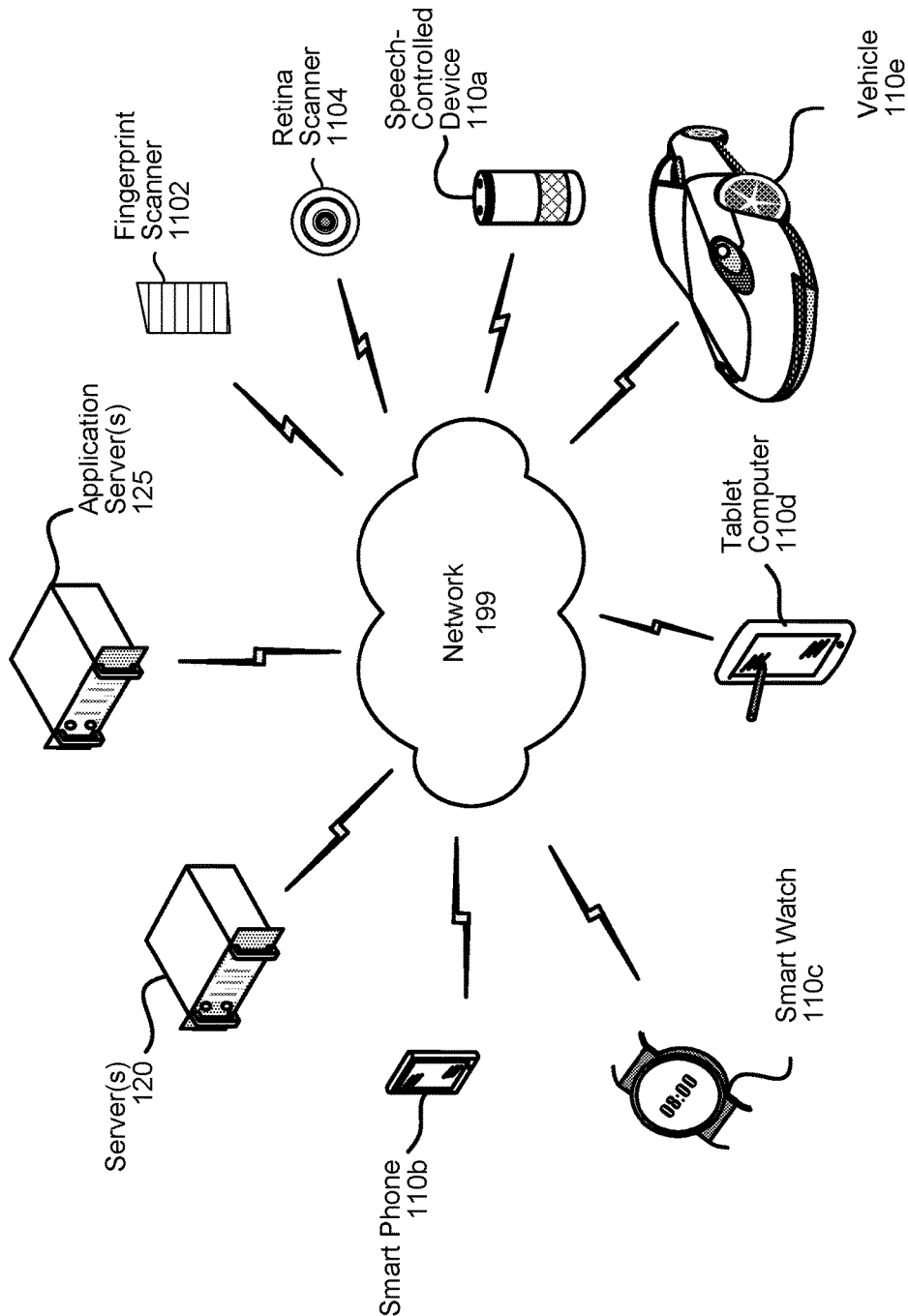
FIG. 11 illustrates an example of a computer network for use with the system.

As illustrated in FIG. 11, multiple devices (120, 125, 110a-110e, 1102, 1104) may contain components of the system 100 and the devices may be connected over a network 199. The network 199 may include a local or private network or may include a wide network such as the Internet. Devices may be connected to the network 199 through either wired or wireless connections. For example, the speech-controlled device 110a, the smart phone 110b, a smart watch 110c, a tablet computer 110d, and/or a vehicle 110e may be connected to the network 199 through a wireless service provider, over a WiFi or cellular network connection, or the like. Other devices are included as network-connected support devices, such as the server 120, application developer devices (e.g., the application server(s) 125), or others. Other devices are included as network-connected biometric sensors, such as a fingerprint scanner 1102, a retina scanner 1104, and the like. The support devices may connect to the network 199 through a wired connection or wireless connection. Networked devices may capture audio using one-or-more built-in or connected microphones 103 or audio capture devices, with processing performed by ASR, NLU, or other components of the same device or another device connected via the network 199, such as the ASR module 250, the NLU module 260, etc. of one or more servers 120.

The concepts disclosed herein may be applied within a number of different devices and computer systems, including, for example, general-purpose computing systems, speech processing systems, object recognition (e.g., facial recognition) systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers, speech processing, object recognition (e.g., facial recognition), and user authentication should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of one or more of the modules and engines may be implemented as in firmware or hardware, such as the AFE 256, which comprises, among other things, analog and/or digital filters (e.g., filters configured as firmware to a digital signal processor (DSP)).

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method, comprising:
receiving, from a first device, first input audio data corresponding to a first spoken utterance;
performing speech recognition processing on the first input audio data to generate first input text data;
performing natural language processing on the first input text data to determine a first request to receive first content;
determining a first content source associated with the first content;
sending, to the first content source, first data requesting the first content;
receiving, from the first content source, a first threshold representing a first user authentication confidence threshold associated with the first content;
determining, based at least in part on the first threshold, at least one user authentication technique;
determining user profile data associated with the first input audio data, the user profile data representing a first plurality of devices;
determining, in the user profile data, first location data associated with the first device;
sending, to the first device based at least in part on the first location data and the at least one user authentication technique, second data requesting first user authentication data;
receiving, from the first device, second input audio data corresponding to a second spoken utterance;
determining, using the second input audio data, a first value representing a first user authentication confidence;
determining a first reliability weight associated with the first device;
determining, using the first value and the first reliability weight, a first weighted value representing a first weighted user authentication confidence; and
sending, to the first content source, first weighted value.

2. The computer-implemented method of claim 1, wherein the plurality of devices further includes a second device, and wherein the computer-implemented method further comprises:
  receiving, from the second device, third data representing one of fingerprint data or password data;
  determining, using the third data, a second value representing a second user authentication confidence;
  determining a second reliability weight associated with the second device;
  determining, using the second value and the second reliability weight, a second weighted value representing a second weighted user authentication confidence;
  determining, using the first weighted value and the second weighted value, a normalized value representing a normalized user authentication confidence;
  sending, to the first content source, the normalized value; and
  receiving the first content from the first content source.

3. The computer-implemented method of claim 1, further comprising:
  receiving, from the first device, third input audio data corresponding to a third spoken utterance;
  performing speech recognition processing on the third input audio data to generate second input text data;
  performing natural language processing on the second input text data to determine a second request to receive the second content;
  determining the first content source is associated with the second content;
  sending, to the first content source, third data requesting the second content;
  receiving, from the first content source, a second threshold representing a second user authentication confidence threshold associated with the second content, the second threshold being greater than the first threshold;
  determining a second device to receive second user authentication data from;
  sending, to the second device, fourth data requesting the second user authentication data;
  receiving, from the second device, fifth data including one of fingerprint data or password data;
  determining, using the fifth data, a second value representing a second user authentication confidence;
  determining a second reliability weight associated with the second device;
  determining, using the second value and the second reliability weight, a second weighted value representing a second weighted user authentication confidence;
  determining, using the first weighted value and the second weighted value, a normalized value representing a normalized user authentication confidence;
  sending, to the first content source, the normalized value; and
  receiving the second content from the first content source.

4. The computer-implemented method of claim 1, further comprising:
  receiving, from the first device, third input audio data corresponding to a third spoken utterance;
  performing speech recognition processing on the third input audio data to generate second input text data;
  performing natural language processing on the second input text data to determine a second request to receive second content;
  determining a second content source associated with the second content; and
  determining, in a library indicating a second plurality of content sources, a second threshold associated with the second content source, the second threshold representing a second user authentication confidence threshold.

5. A system, comprising:
  at least one processor; and
  at least one memory including instructions that, when executed by the at least one processor, cause the system to:
    receive first user input requesting first content be output;
    determine a first threshold representing a first user authentication confidence threshold;
    based at least in part on the first threshold, determine at least a first user authentication technique;
    determine user profile data associated with the first user input, the user profile data representing a plurality of devices;
    determine, in the user profile data, first location data associated with a first device;
    receive, from the first device based at least in part on the first location data and the at least one first user authentication technique, first user authentication data;
    determine, based at least in part on the first user authentication data, a first value representing a first user authentication confidence;
    determine the first value satisfies the first threshold; and
    after determining the first value satisfies the first threshold, cause the first content to be output.

6. The system of claim 5, wherein the at least one memory further includes instructions that, when executed by the at least one processor, further cause the system to:
    send, to a content source associated with the first content, first data requesting the first content; and
    receive, from the content source, the first threshold.

7. The system of claim 5, wherein the at least one memory further includes instructions that, when executed by the at least one processor, further cause the system to:
    receive second user input requesting second content be output;
    access a storage indicating content sources associated with respective user authentication confidence thresholds;
    determine a content source associated with the second content; and
    determine, in the storage, the content source is associated with a second threshold representing a second user authentication confidence threshold.

8. The system of claim 5, wherein the at least one memory further includes instructions that, when executed by the at least one processor, further cause the system to:
    determine a first reliability weight associated with one of the first device or the at least a first user authentication technique;
    determine, based at least in part on the first value and the first reliability weight, a weighted value representing a weighted user authentication confidence;
    determine the weighted value satisfies the first threshold; and
    receive the first content after determining the weighted value satisfies the first threshold.

9. The system of claim 5, wherein the at least one memory further includes instructions that, when executed by the at least one processor, further cause the system to:
    determine the first value is less than the first threshold;
    receive, from the first device, second user authentication data;

determine, based at least in part on the second user authentication data, a second value representing a second user authentication confidence;

determine, based at least in part on the first value and the second value, a normalized value representing a normalized user authentication confidence;

determine the normalized value satisfies the first threshold; and receive the first content after determining the normalized value satisfies the first threshold.

10. The system of claim 5, wherein the first user authentication data represents at least one of:
a specified-portion of an alphanumeric passcode;
a specified portion of a pass phrase;
speech recognition results;
facial recognition results; or
biometric verification results.

11. The system of claim 5, wherein the at least one memory further includes instructions that, when executed by the at least one processor, further cause the system to:
determine a second device configured to provide the first user authentication data.

12. The system of claim 5, wherein the at least one memory further includes instructions that, when executed by the at least one processor, further cause the system to:
receive a second user input requesting second content be output;
determine a second threshold representing a second user authentication confidence threshold, the second threshold being greater than the first threshold;
receive, from a second device, second user authentication data;
determine, based at least in part on the second user authentication data, a second value representing a second user authentication confidence;
determine, based at least in part on the first value and the second value, a normalized value representing a normalized user authentication confidence;
determine the normalized value satisfies the second threshold; and
receive the second content after determining the normalized value satisfies the second threshold.

13. A computer-implemented method, comprising:
receive first user input requesting first content be output;
determining a first threshold representing a first user authentication confidence threshold;
based at least in part on the first threshold, determine at least a first user authentication technique;
determining user profile data associated with the first user input, the user profile data representing a plurality of devices;
determining, in the user profile data, first location data associated with a first device;
receiving, from the first device based at least in part on the first location data and the first user authentication technique, first user authentication data;
determining, based at least in part on the first user authentication data, a first value representing a first user authentication confidence;
determining the first value satisfies the first threshold; and
after determining the first value satisfies the first threshold, causing the first content to be output.

14. The computer-implemented method of claim 13, wherein determining the first threshold confidence comprises:
sending, to a content source associated with the first content, first data requesting the first content; and
receiving, from the content source, the first threshold.

15. The computer-implemented method of claim 13, further comprising:
receiving second user input requesting second content be output;
accessing a storage indicating content sources associated with respective user authentication confidence thresholds;
determining a content source associated with the second content; and
determining, in the storage, the content source is associated with a second threshold representing a second user authentication confidence threshold.

16. The computer-implemented method of claim 13, further comprising:
determining a first reliability weight associated with one of the first device or the at least a first user authentication technique;
determining, based at least in part on the first value and the first reliability weight, a weighted value representing a weighted user authentication confidence;
determining the weighted value satisfies the first threshold; and
receiving the first content after determining the weighted value satisfies the first threshold.

17. The computer-implemented method of claim 13, further comprising:
determining the first value is less than the first threshold;
receiving, from the first device, second user authentication data;
determining, based at least in part on the second user authentication data, a second value representing a second user authentication confidence;
determining, based at least in part on the first value and the second value, a normalized value representing a normalized user authentication confidence;
determining the normalized value satisfies the first threshold; and
receiving the first content after determining the normalized value satisfies the first threshold.

18. The computer-implemented method of claim 13, wherein receiving the first user authentication data comprises receiving at least one of:
a specified portion of an alphanumeric passcode;
a specified portion of a pass phrase;
speech recognition results;
facial recognition results; or
biometric verification results.

19. The computer-implemented method of claim 13, further comprising:
determining a second device configured to provide the first user authentication data.

20. The computer-implemented method of claim 13, further comprising:
receiving a second user input requesting second content be output;
determining a second threshold representing a second user authentication confidence threshold, the second threshold being greater than the first threshold;
receiving, from a second device, second user authentication data;
determining, based at least in part on the second user authentication data, a second value representing a second user authentication confidence;
determining, based at least in part on the first value and the second value, a normalized value representing a normalized user authentication confidence;

determining the normalized value satisfies the second threshold; and receiving the second content after determining the normalized value satisfies the second threshold.

* * * * *